US011734172B2

(12) United States Patent
Zhou

(10) Patent No.: US 11,734,172 B2
(45) Date of Patent: *Aug. 22, 2023

(54) DATA TRANSMISSION METHOD AND APPARATUS USING RESOURCES IN A RESOURCE POOL OF A SAME NUMA NODE

(71) Applicant: HUAWEI TECHNOLOGIES CO., LTD., Guangdong (CN)

(72) Inventor: Lei Zhou, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 136 days.

This patent is subject to a terminal disclaimer.

(21) Appl. No.: 17/241,910

(22) Filed: Apr. 27, 2021

(65) Prior Publication Data

US 2021/0248070 A1 Aug. 12, 2021

Related U.S. Application Data

(63) Continuation of application No. 16/358,116, filed on Mar. 19, 2019, now Pat. No. 11,023,373, which is a continuation of application No. PCT/CN2017/102078, filed on Sep. 18, 2017.

(30) Foreign Application Priority Data

Sep. 20, 2016 (CN) .......................... 201610836553.X

(51) Int. Cl.
*G06F 12/06* (2006.01)
*H04L 12/64* (2006.01)
(Continued)

(52) U.S. Cl.
CPC .......... *G06F 12/06* (2013.01); *G06F 9/45558* (2013.01); *G06F 9/4881* (2013.01);
(Continued)

(58) Field of Classification Search
CPC .... G06F 12/06; G06F 9/45558; G06F 9/4881; G06F 9/5016; G06F 9/5027;
(Continued)

(56) References Cited

U.S. PATENT DOCUMENTS

2013/0239119 A1* 9/2013 Garg ..................... G06F 9/5083
718/105
2014/0237197 A1 8/2014 Gray
(Continued)

FOREIGN PATENT DOCUMENTS

| CA | 2938033 A1 | 9/2015 |
| CN | 102567226 A | 7/2012 |

(Continued)

*Primary Examiner* — Wissam Rashid
(74) *Attorney, Agent, or Firm* — Womble Bond Dickinson (US) LLP

(57) ABSTRACT

The present application discloses a data transmission method and apparatus. Multiple first data blocks of one service are received by a network interface card and the card allocates the received multiple first data blocks to a same data queue. When a tuner generates scheduling information for the service, the multiple first data blocks is sent to a virtual machine by using a resource in a resource pool of a NUMA node designated in the scheduling information; or when a tuner does not generate scheduling information, determining, according to a correspondence between the data queue and a resource pool of a NUMA node, a resource pool corresponding to the data queue in which the multiple first data blocks are located, and sending the multiple first data blocks to a virtual machine.

20 Claims, 8 Drawing Sheets

(51) Int. Cl.
*G06F 9/50* (2006.01)
*H04L 65/40* (2022.01)
*G06F 9/455* (2018.01)
*G06F 9/48* (2006.01)

(52) U.S. Cl.
CPC .......... *G06F 9/5016* (2013.01); *G06F 9/5027* (2013.01); *G06F 9/5077* (2013.01); *H04L 12/6418* (2013.01); *H04L 65/40* (2013.01); *G06F 2009/45583* (2013.01); *G06F 2209/548* (2013.01); *G06F 2212/2542* (2013.01)

(58) Field of Classification Search
CPC ......... G06F 9/5077; G06F 2009/45583; G06F 2209/548; G06F 2212/2542; H04L 12/6418; H04L 65/40
See application file for complete search history.

(56) References Cited

U.S. PATENT DOCUMENTS

2016/0070598 A1 3/2016 Vadkerti et al.
2016/0085571 A1 3/2016 Kim et al.

FOREIGN PATENT DOCUMENTS

| CN | 103365658 A | 10/2013 |
|---|---|---|
| CN | 104038389 A | 9/2014 |
| CN | 104050091 A | 9/2014 |
| WO | 2016035003 A1 | 3/2016 |

* cited by examiner

DATA TRANSMISSION METHOD AND APPARATUS USING RESOURCES IN A RESOURCE POOL OF A SAME NUMA NODE

CROSS-REFERENCE TO RELATED APPLICATIONS

This application is a continuation of U.S. patent application Ser. No. 16/358,116, filed on Mar. 19, 2019, which is a continuation of International Application No. PCT/CN2017/102078, filed on Sep. 18, 2017. The International Application claims priority to Chinese Patent Application No. 201610836553.X, filed on Sep. 20, 2016. All of the aforementioned patent applications are hereby incorporated by reference in their entireties.

TECHNICAL FIELD

The present application relates to the field of communications technologies, and in particular, to a data transmission method and apparatus.

BACKGROUND

In Network Functions Virtualization (NFV), a virtualization technology is used to allocate a required virtual resource (virtual computing, storage, and a network) to a network application. An ultimate objective of NFV is to replace private and dedicated network element devices in a communications network by using an x86 server, a storage device, and a switching device that are based on an industry standard. In an NFV scenario, network functions such as a firewall, traffic-based charging, and a routing service that run on the network element device are migrated to a Virtual Machine, (VM) for running, so that costs are reduced and resource utilization and a flexible control capability are improved.

Because cloud computing is constantly expanded and virtual machines are increasing, a higher requirement is imposed on performance of an existing network interface card. Currently, a mainstream solution of changing a network interface card drive is a DPDK technology provided by Intel. A DPDK is an application program development kit that is provided by Intel and that is used to improve a data packet processing rate. In the DPDK technology, a solution of allocating a resource pool in advance is used, that is, a memory is applied for in advance to serve as the resource pool. Storage capacities of resource pools are the same. When data is received or sent, a resource pool is first determined, and the data is carried by using the determined resource pool. In the conventional DPDK technology, if an operating system allocates the resource pool, the operating system allocates a non-uniform memory access (NUMA) node to which each resource pool belongs. When to-be-transmitted data includes multiple data flows, the operating system allocates resources in resource pools of multiple NUMA nodes to the data, and a cross-NUMA node operation is performed. Consequently, data transmission performance is deteriorated.

SUMMARY

This application provides a data transmission method and apparatus, so as to ensure that resources used for multiple data blocks of one service are located in a resource pool of a same NUMA node, reduce cross-NUMA node operations, and improve data transmission performance.

According to a first aspect, a data transmission method is provided, where the method may be applied to a physical machine, a virtual machine and a tuner may run on the physical machine, and the physical machine may include a network interface card and a NUMA node. The physical machine may receive, by using the network interface card, multiple first data blocks of one service that are sent by another physical machine, and allocate the received multiple first data blocks to a same data queue by using the network interface card. The data queue is corresponding to the network interface card. When the tuner generates scheduling information for the service, the physical machine may send the multiple first data blocks to the virtual machine by using a resource in a resource pool of a NUMA node designated in the scheduling information, where the scheduling information is used to instruct to schedule the resource from the resource pool of the designated NUMA node to process the multiple first data blocks; or when the tuner does not generate scheduling information, the physical machine may determine, according to a correspondence between the data queue and a resource pool of a NUMA node, a resource pool corresponding to the data queue in which the multiple first data blocks are located, and send the multiple first data blocks to the virtual machine by using a resource in the resource pool corresponding to the data queue in which the multiple first data blocks are located.

In the technical solution, one service may be corresponding to at least one data flow, and any one of the at least one data flow includes multiple data blocks. The physical machine may receive, by using the network interface card, the multiple data blocks of the service that are sent by the another physical machine, and the multiple data blocks of the service may be all data blocks of the service that currently need to be sent to the virtual machine. For example, if the service is corresponding to one data flow, and the data flow includes three data blocks, the physical machine may receive, by using the network interface card, the three data blocks of the service that are sent by the another physical machine. For another example, if the service is corresponding to three data flows: a first data flow, a second data flow, and a third data flow, the first data flow includes two data blocks, the second data flow includes three data blocks, and the third data flow includes four data blocks, the physical machine may receive, by using the network interface card, the nine data blocks of the service that are sent by the another physical machine. Further, the physical machine may allocate the received multiple first data blocks to the same data queue by using the network interface card. For example, if the network interface card is corresponding to three data queues, and a current data amount of a first data queue in the three data queues is less than a preset data amount threshold, the physical machine may allocate the received multiple first data blocks to the first data queue by using the network interface card. Further, the physical machine may detect whether the tuner generates the scheduling information for the service. When the tuner generates the scheduling information for the service, the physical machine may send the multiple first data blocks to the virtual machine by using the resource in the resource pool of the NUMA node designated in the scheduling information, so as to ensure that resources used for the multiple first data blocks of the service are located in a resource pool of a same NUMA node, reduce cross-NUMA node operations, and improve data transmission performance. In addition, when detecting that the tuner does not generate the scheduling information, the physical machine may determine, according to the correspondence between the data queue and the resource pool of the NUMA node, the resource pool corresponding to the data queue in which the multiple first data blocks are located, and send the multiple first data blocks to the virtual machine by using the resource in the resource pool corresponding to the data queue in which the first data blocks are located. For example, the physical machine may establish the correspondence between the data queue and the resource pool of the NUMA node. For example, the first data queue is corresponding to a resource pool of a first NUMA node, a second data queue is corresponding to a resource pool of a second NUMA node, and a third data queue is corresponding to a resource pool of a third NUMA node. The physical machine allocates the multiple first data blocks of the service to the first data queue by using the network interface card. When the tuner does not generate the scheduling information, the physical machine may determine, according to the correspondence between the data queue and the resource pool of the NUMA node, that a resource pool corresponding to the first data queue is the resource pool of the first NUMA node, and send the multiple first data blocks to the virtual machine by using a resource in the resource pool of the first NUMA node, so as to ensure that resources used for the multiple first data blocks of the service are located in a resource pool of a same NUMA node, reduce cross-NUMA node operations, and improve data transmission performance.

The physical machine may include at least one network interface card, any one of the at least one network interface card may be corresponding to at least one data queue, and the data queue may be used to cache data. For example, the physical machine may include one network interface card, and the network interface card may be corresponding to three data queues. For another example, the physical machine may include three network interface cards, and each network interface card may be corresponding to one data queue.

The Network Interface Card (NIC) is also referred to as a network adapter, and is an interface for connecting a computer and a transmission medium in a local area network. The network interface card not only can implement a physical connection and electrical signal matching between the computer and the transmission medium in the local area network, but also has a function such as data cache or data encoding and decoding. For example, the network interface card may include a physical network interface card, a virtual network interface card, or the like.

The physical machine may include at least one NUMA node, and the NUMA node may be a hardware apparatus. It should be noted that, the physical machine may include a NUMA server, the NUMA server may comprise multiple NUMA nodes, a resource pool is accordingly configured for each NUMA node, and the resource pool may include a memory resource.

The NUMA node may provide a memory (that is, a local memory) in a resource pool of the NUMA node for a CPU. A speed at which the CPU accesses the local memory is higher than a speed at which the CPU accesses a remote memory (that is, a memory in a resource pool of another NUMA node or a memory in an internal storage), so that a memory access speed and data transmission performance can be improved. For example, the physical machine may determine a quantity of NUMA nodes according to parameter information of the NUMA server, obtain a preconfigured resource pool data capacity, then multiply the determined quantity of NUMA nodes by the preconfigured resource pool data capacity to obtain a resource volume of a memory for which the internal storage needs to be applied to, apply to the internal storage for a memory that meets a requirement of the resource volume, and allocate the applied memory to the NUMA nodes. For example, if the physical machine currently includes three NUMA nodes, and a preconfigured resource pool data capacity of each NUMA node is 30 MB, the physical machine may apply to the internal storage for a memory of a resource volume 90 MB, and allocate a memory of a resource volume 30 MB to each NUMA node.

In one embodiment, after sending the multiple first data blocks to the virtual machine by using the resource in the resource pool of the NUMA node designated in the scheduling information, the physical machine may further receive multiple second data blocks of the service that are fed back by the virtual machine in response to the multiple first data blocks, and send the multiple second data blocks to the network interface card by using a resource in the resource pool of the NUMA node designated in the scheduling information. The resource pool to which the resource scheduled for processing the multiple second data blocks belongs is the same as the resource pool to which the resource scheduled for processing the multiple first data blocks belongs.

In the technical solution, after the physical machine allocates the multiple first data blocks to the same data queue by using the network interface card, a user may designate the NUMA node for the service by using the tuner (tuner), and the tuner may generate the scheduling information for the service. The scheduling information is used to instruct to schedule the resource from the resource pool of the designated NUMA node to process the multiple first data blocks. When detecting that the tuner generates the scheduling information, the physical machine may send the multiple first data blocks to the virtual machine by using the resource in the resource pool of the NUMA node designated in the scheduling information. Further, after receiving the multiple second data blocks of the service that are fed back by the virtual machine in response to the multiple first data blocks, the physical machine may send the multiple second data blocks to the network interface card by using the resource in the resource pool of the NUMA node designated in the scheduling information. In this embodiment of the present invention, it can be ensured that a resource used for transmitting the multiple first data blocks and a resource used for transmitting the multiple second data blocks belong to a resource pool of a same NUMA node, the cross-NUMA node operations can be reduced, and the data transmission performance can be improved.

In one embodiment, after sending the multiple first data blocks to the virtual machine by using the resource in the resource pool corresponding to the data queue in which the first data blocks are located, the physical machine may further receive multiple second data blocks of the service that are fed back by the virtual machine in response to the multiple first data blocks, determine a resource pool corresponding to the multiple second data blocks, and send the multiple second data blocks to the network interface card by using a resource in the resource pool corresponding to the multiple second data blocks. The resource pool corresponding to the multiple second data blocks is the same as the resource pool corresponding to the multiple first data blocks.

In the technical solution, the physical machine may be a receive end, and the another physical machine may be a transmit end. The multiple first data blocks of the service that are received by the physical machine and that are sent by the another physical machine may be sent data, the multiple second data blocks of the service that are fed back by the virtual machine in response to the multiple first data blocks may be received data, and the sent data and the received data are for the same service. To ensure that resources used for multiple data blocks of the service are located in a resource pool of a same NUMA node, the physical machine may use the resource pool corresponding to the multiple first data blocks as the resource pool corresponding to the multiple second data blocks, and send the multiple second data blocks to the network interface card by using the resource in the resource pool corresponding to the multiple second data blocks. That is, a resource used for transmitting the multiple first data blocks and a resource used for transmitting the multiple second data blocks belong to a resource pool of a same NUMA node, the cross-NUMA node operations can be reduced, and the data transmission performance can be improved.

In one embodiment, after determining, according to the correspondence between the data queue and the resource pool of the NUMA node, the resource pool corresponding to the data queue in which the multiple first data blocks are located, the physical machine may sort address information of any one of the multiple first data blocks according to a preset rule, calculate a hash value of the first data block by using sorted address information of the first data block, and establish a second mapping relationship. The second mapping relationship is a mapping relationship between the hash value and the NUMA node to which the resource pool corresponding to the data queue in which the first data block is located belongs. Further, the physical machine may send the multiple first data blocks and the second mapping relationship to the virtual machine by using a resource in the resource pool corresponding to the data queue in which the multiple first data blocks are located.

The address information of the first data block may include a source address and a destination address, source addresses of all of the multiple first data blocks are the same, and destination addresses of all of the multiple first data blocks are the same. The address information of the first data block may be a Media Access Control (MAC) address, an Internet Protocol (IP) address, or the like. Because the multiple first data blocks are sent by the another physical machine to the physical machine, the source addresses of the first data blocks are the same, and the source addresses of the first data blocks may be a MAC address, an IP address, or the like of the another physical machine. The destination addresses of the first data blocks are the same, and the destination addresses of the first data blocks may be a MAC address, an IP address, or the like of the physical machine.

In the technical solution, the preset rule may be sorting the address information in descending order or in ascending order. For example, the physical machine may sort a source address and a destination address of any first data block in descending order (or in ascending order), and perform analysis processing on the sorted address information by using a preset data digest algorithm, to obtain the hash value of the first data block. The physical machine may establish the second mapping relationship, that is, the mapping relationship between the hash value and the NUMA node to which the resource pool corresponding to the data queue in which the first data block is located belongs. Then the physical machine may send the multiple first data blocks and the second mapping relationship to the virtual machine by using the resource in the resource pool corresponding to the data queue in which the first data blocks are located. The preset data digest algorithm may include a Cyclic Redundancy Check (CRC) algorithm, a message digest algorithm 5 (MD5), a secure hash algorithm (SHA), or the like. For example, if a source address of any first data block is 192.115.26.3, and a destination address of the first data block is 185.114.49.22, the physical machine may determine that a first number (that is, 192) in the source address is greater than a first number (that is, 185) in the destination address, and the physical machine may determine that the source address is greater than the destination address, and then arrange the source address of the first data block ahead of the destination address. That is, sorted address information is 1921152631851144922. The physical machine may perform analysis processing on the sorted address information by using the preset data digest algorithm, to obtain a hash value of the first data block. The physical machine may establish a mapping relationship between the hash value and the NUMA node to which the resource pool corresponding to the data queue in which the first data block is located belongs.

In one embodiment, that the physical machine determines the resource pool corresponding to the multiple second data blocks may be specifically: sorting address information of any one of the multiple second data blocks according to the preset rule; calculating a hash value of the second data block by using sorted address information of the second data block, where the hash value of the first data is the same as the hash value of the second data; determining, according to the second mapping relationship, a NUMA node corresponding to the hash value of the second data block; and using a resource pool of the NUMA node corresponding to the hash value of the second data block as the resource pool corresponding to the multiple second data blocks.

The address information of the second data block may include a source address and a destination address, a source address of each of the multiple second data blocks is the same as a destination address of each first data block, and a destination address of each of the multiple second data blocks is the same as a source address of each first data block. The address information of the second data block may be a MAC address, an IP address, or the like. Because the multiple second data blocks are sent by the physical machine to the network interface card by using the virtual machine, and are sent to the another physical machine by using the network interface card, the source addresses of the second data blocks are the same, the source addresses of the second data blocks may be the MAC address, the IP address, or the like of the physical machine, and the source address of the second data block is the same as the destination address of the first data block; and the destination addresses of the second data blocks are the same, the destination addresses of the second data blocks may be the MAC address, the IP address, or the like of the another physical machine, and the destination address of the second data block is the same as the source address of the first data block.

In the technical solution, the physical machine sorts the address information of the second data block in descending order (or in ascending order), and the sorted address information of the second data block is the same as the sorted address information of the first data block. The physical machine performs analysis processing on the sorted address information of the second data block according to the preset data digest algorithm to obtain the hash value of the second data block, and the hash value of the second data block is the same as the hash value of the first data block. The physical machine may determine, according to the established mapping relationship between the hash value and the NUMA node to which the resource pool corresponding to the data queue in which the first data block is located belongs, that the resource pool corresponding to the second data block is the resource pool corresponding to the data queue in which the first data block is located. In this embodiment of the present invention, it can be ensured that the resource used for transmitting the multiple first data blocks and the resource used for transmitting the multiple second data blocks belong to the resource pool of the same NUMA node, the cross-NUMA node operations can be reduced, and the data transmission performance can be improved.

In one embodiment, before sending the multiple first data blocks to the virtual machine by using the resource in the resource pool corresponding to the data queue in which the multiple first data blocks are located, the physical machine may obtain current remaining space of the resource pool corresponding to the data queue in which the multiple first data blocks are located, and determine a resource volume of resources that are required to transmit the multiple first data blocks; and when the resource volume of the resources that are required to transmit the multiple first data blocks is less than the current remaining space of the determined resource pool, the physical machine is triggered to send the multiple first data blocks to the virtual machine by using the resource in the resource pool corresponding to the data queue in which the multiple first data blocks are located.

In the technical solution, the physical machine may detect whether the resource volume of the resources that are required to transmit the multiple first data blocks is less than the current remaining space of the resource pool corresponding to the data queue in which the multiple first data blocks are located. When the resource volume of the resources that are required to transmit the multiple first data blocks is less than the current remaining space of the determined resource pool, the physical machine may send the multiple first data blocks to the virtual machine by using the resource in the resource pool corresponding to the data queue in which the multiple first data blocks are located. For example, if the current remaining space of the resource pool corresponding to the data queue in which the multiple first data blocks are located is 10 MB, and the resource volume of the resources that are required to transmit the multiple first data blocks is 5 MB, the physical machine determines that a resource volume of unused resources in the resource pool corresponding to the data queue in which the multiple first data blocks are located can meet a requirement of transmitting the multiple first data blocks, and then the physical machine may send the multiple first data blocks to the virtual machine by using the resource in the resource pool corresponding to the data queue in which the multiple first data blocks are located. In this embodiment of the present invention, it can be ensured that all of the multiple first data blocks can be transmitted to the virtual machine, and data transmission reliability can be improved.

In one embodiment, after sending the multiple first data blocks to the virtual machine by using the resource in the resource pool corresponding to the data queue in which the multiple first data blocks are located, the physical machine may subtract, from the current remaining space of the resource pool corresponding to the data queue in which the multiple first data blocks are located, the resource volume of the resources that are required to transmit the multiple first data blocks, to update the current remaining space of the resource pool corresponding to the data queue in which the multiple first data blocks are located.

In the technical solution, when the physical machine sends the multiple first data blocks to the virtual machine by using the resource in the resource pool corresponding to the data queue in which the multiple first data blocks are located, the resource in the resource pool corresponding to the data queue in which the multiple first data blocks are located is occupied, and the physical machine may update the current remaining space of the resource pool corresponding to the data queue in which the multiple first data blocks are located. When a resource in the resource pool needs to be used for other data, the physical machine may determine, according to a resource volume of resources required for the other data and updated current remaining space of the resource pool, whether to use a resource in the resource pool to transmit the other data. In this embodiment of the present invention, the current remaining space of the resource pool can be updated in real time, so that accuracy of the current remaining space of the resource pool is improved.

In one embodiment, after obtaining the current remaining space of the resource pool corresponding to the data queue in which the multiple first data blocks are located, the physical machine may obtain a proportion of the current remaining space of the resource pool corresponding to the data queue in which the multiple first data blocks are located to a data capacity of the resource pool corresponding to the data queue in which the multiple first data blocks are located. When the proportion is less than a preset proportion threshold, the physical machine updates the resource pool corresponding to the multiple first data blocks. Further, that the physical machine sends the multiple first data blocks to the virtual machine by using the resource in the resource pool corresponding to the data queue in which the multiple first data blocks are located may be specifically: sending the multiple first data blocks to the virtual machine by using a resource in an updated resource pool corresponding to the multiple first data blocks.

In the technical solution, the physical machine may obtain the proportion of the current remaining space of the resource pool corresponding to the data queue in which the multiple first data blocks are located to the data capacity of the resource pool corresponding to the data queue in which the multiple first data blocks are located. When the proportion is less than the preset proportion threshold, the physical machine may determine that the remaining space of the resource pool corresponding to the data queue in which the multiple first data blocks are located is relatively small, and may determine that many resources are used, and the physical machine may update the resource pool corresponding to the multiple first data blocks, so as to avoid using resources in a same resource pool to transmit data blocks of multiple services and improve resource utilization.

In one embodiment, when receiving the scheduling information, after determining that the resource pool corresponding to the data queue in which the multiple first data blocks are located is the resource pool corresponding to the multiple first data blocks, the physical machine may detect whether a resource in a resource pool of a NUMA node, in the NUMA server, other than the NUMA node to which the resource pool corresponding to the data queue in which the multiple first data blocks are located belongs is currently occupied. When the resource in the resource pool of the another NUMA node is currently unoccupied, the physical machine may delete the resource pool of the another NUMA node, so as to release the resource in the resource pool of the another NUMA node.

In the technical solution, when the resource in the resource pool of the another NUMA node is currently unoccupied, the physical machine may delete the resource pool of the another NUMA node, so as to avoid a case in which the previously applied resource in the resource pool of the another NUMA node is unused and remaining resources in the internal storage are insufficient, thereby improving resource utilization.

According to a second aspect, a data transmission apparatus is provided, where the apparatus is applied to a physical machine, a virtual machine and a tuner run on the physical machine, the physical machine includes a network interface card and a NUMA node, and the apparatus may include a data block receiving module, a data block allocation module, and a data block sending module.

The data block receiving module is configured to receive, by using the network interface card, multiple first data blocks of one service that are sent by another physical machine.

The data block allocation module is configured to allocate the received multiple first data blocks to a same data queue by using the network interface card. The data queue is corresponding to the network interface card.

The data block sending module is configured to: when the tuner generates scheduling information for the service, send the multiple first data blocks to the virtual machine by using a resource in a resource pool of a NUMA node designated in the scheduling information. The scheduling information is used to instruct to schedule the resource from the resource pool of the designated NUMA node to process the multiple first data blocks.

The data block sending module is further configured to: when the tuner does not generate the scheduling information, determine, according to a correspondence between the data queue and a resource pool of a NUMA node, a resource pool corresponding to the data queue in which the multiple first data blocks are located, and send the multiple first data blocks to the virtual machine by using a resource in the resource pool corresponding to the data queue in which the multiple first data blocks are located.

In the technical solution, one service may be corresponding to at least one data flow, and any one of the at least one data flow includes multiple data blocks. The data block receiving module may receive, by using the network interface card, the multiple data blocks of the service that are sent by the another physical machine, and the multiple data blocks of the service may be all data blocks of the service that currently need to be sent to the virtual machine. For example, if the service is corresponding to one data flow, and the data flow includes three data blocks, the data block receiving module may receive, by using the network interface card, the three data blocks of the service that are sent by the another physical machine. For another example, if the service is corresponding to three data flows: a first data flow, a second data flow, and a third data flow, the first data flow includes two data blocks, the second data flow includes three data blocks, and the third data flow includes four data blocks, the data block receiving module may receive, by using the network interface card, the nine data blocks of the service that are sent by the another physical machine. Further, the data block allocation module may allocate the received multiple first data blocks to the same data queue by using the network interface card. For example, if the network interface card is corresponding to three data queues, and a current data amount of a first data queue in the three data queues is less than a preset data amount threshold, the data block allocation module may allocate the received multiple first data blocks to the first data queue by using the network interface card. Further, the data block sending module may detect whether the tuner generates the scheduling information for the service. When the tuner generates the scheduling information for the service, the data block sending module may send the multiple first data blocks to the virtual machine by using the resource in the resource pool of the NUMA node designated in the scheduling information, so as to ensure that resources used for the multiple first data blocks of the service are located in a resource pool of a same NUMA node, reduce cross-NUMA node operations, and improve data transmission performance. In addition, when detecting that the tuner does not generate the scheduling information, the data block sending module may determine, according to the correspondence between the data queue and the resource pool of the NUMA node, the resource pool corresponding to the data queue in which the multiple first data blocks are located, and send the multiple first data blocks to the virtual machine by using the resource in the resource pool corresponding to the data queue in which the first data blocks are located. For example, the physical machine may establish the correspondence between the data queue and the resource pool of the NUMA node. For example, the first data queue is corresponding to a resource pool of a first NUMA node, a second data queue is corresponding to a resource pool of a second NUMA node, and a third data queue is corresponding to a resource pool of a third NUMA node. The data block allocation module allocates the multiple first data blocks of the service to the first data queue by using the network interface card. When the tuner does not generate the scheduling information, the data block sending module may determine, according to the correspondence between the data queue and the resource pool of the NUMA node, that a resource pool corresponding to the first data queue is the resource pool of the first NUMA node, and send the multiple first data blocks to the virtual machine by using a resource in the resource pool of the first NUMA node, so as to ensure that resources used for the multiple first data blocks of the service are located in a resource pool of a same NUMA node, reduce cross-NUMA node operations, and improve data transmission performance.

The physical machine may include at least one network interface card, any one of the at least one network interface card may be corresponding to at least one data queue, and the data queue may be used to cache data. For example, the physical machine may include one network interface card, and the network interface card may be corresponding to three data queues. For another example, the physical machine may include three network interface cards, and each network interface card may be corresponding to one data queue.

The network interface card (Network Interface Card, NIC) is also referred to as a network adapter, and is an interface for connecting a computer and a transmission medium in a local area network. The network interface card not only can implement a physical connection and electrical signal matching between the computer and the transmission medium in the local area network, but also has a function such as data cache or data encoding and decoding. For example, the network interface card may include a physical network interface card, a virtual network interface card, or the like.

The physical machine may include at least one NUMA node, and the NUMA node may be a hardware apparatus. It should be noted that, the physical machine may include a NUMA server, the NUMA server may comprise multiple NUMA nodes, a resource pool is accordingly configured for each NUMA node, and the resource pool may include resources such as a central processing unit (Central Processing Unit, CPU), a memory, and an input/output (input/output, I/O).

The NUMA node may provide a memory (that is, a local memory) in a resource pool of the NUMA node for a CPU in the resource pool of the NUMA node. A speed at which the CPU accesses the local memory is higher than a speed at which the CPU accesses a remote memory (that is, a memory in a resource pool of another NUMA node or a memory in an internal storage), so that a memory access speed and data transmission performance can be improved. For example, the physical machine may determine a quantity of NUMA nodes according to parameter information of the NUMA server, obtain a preconfigured resource pool data capacity, then multiply the determined quantity of NUMA nodes by the preconfigured resource pool data capacity to obtain a resource volume of a memory for which the internal storage needs to be applied to, apply to the internal storage for a memory that meets a requirement of the resource volume, and allocate the applied memory to the NUMA nodes. For example, if the physical machine currently includes three NUMA nodes, and a preconfigured resource pool data capacity of each NUMA node is 30 MB, the physical machine may apply to the internal storage for a memory of a resource volume 90 MB, and allocate a memory of a resource volume 30 MB to each NUMA node.

In one embodiment, the data transmission apparatus described in the second aspect may be configured to implement some or all steps in the first aspect.

According to a third aspect, a computer readable storage medium storing one or more programs is provided, the one or more programs include an instruction, and when the instruction is executed by a physical machine, the physical machine executes the method provided in any one of the first aspect or all possible designs of the first aspect.

According to a fourth aspect, a physical machine is provided, where the physical machine includes a hardware layer, a virtual machine and a tuner run on the physical machine, the hardware layer includes a processor, a storage, a network interface card, and a NUMA node, the storage stores a group of program code, and the processor invokes the program code stored in the storage, to perform the following operations: receiving, by using the network interface card, multiple first data blocks of one service that are sent by another physical machine; allocating the received multiple first data blocks to a same data queue by using the network interface card, where the data queue is corresponding to the network interface card; and when the tuner generates scheduling information for the service, sending the multiple first data blocks to the virtual machine by using a resource in a resource pool of a NUMA node designated in the scheduling information, where the scheduling information is used to instruct to schedule the resource from the resource pool of the designated NUMA node to process the multiple first data blocks; or when the tuner does not generate scheduling information, determining, according to a correspondence between the data queue and a resource pool of a NUMA node, a resource pool corresponding to the data queue in which the multiple first data blocks are located, and sending the multiple first data blocks to the virtual machine by using a resource in the resource pool corresponding to the data queue in which the multiple first data blocks are located.

In one embodiment, the physical machine described in the fourth aspect may be configured to implement some or all steps in the first aspect.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present invention.

Figure 1:
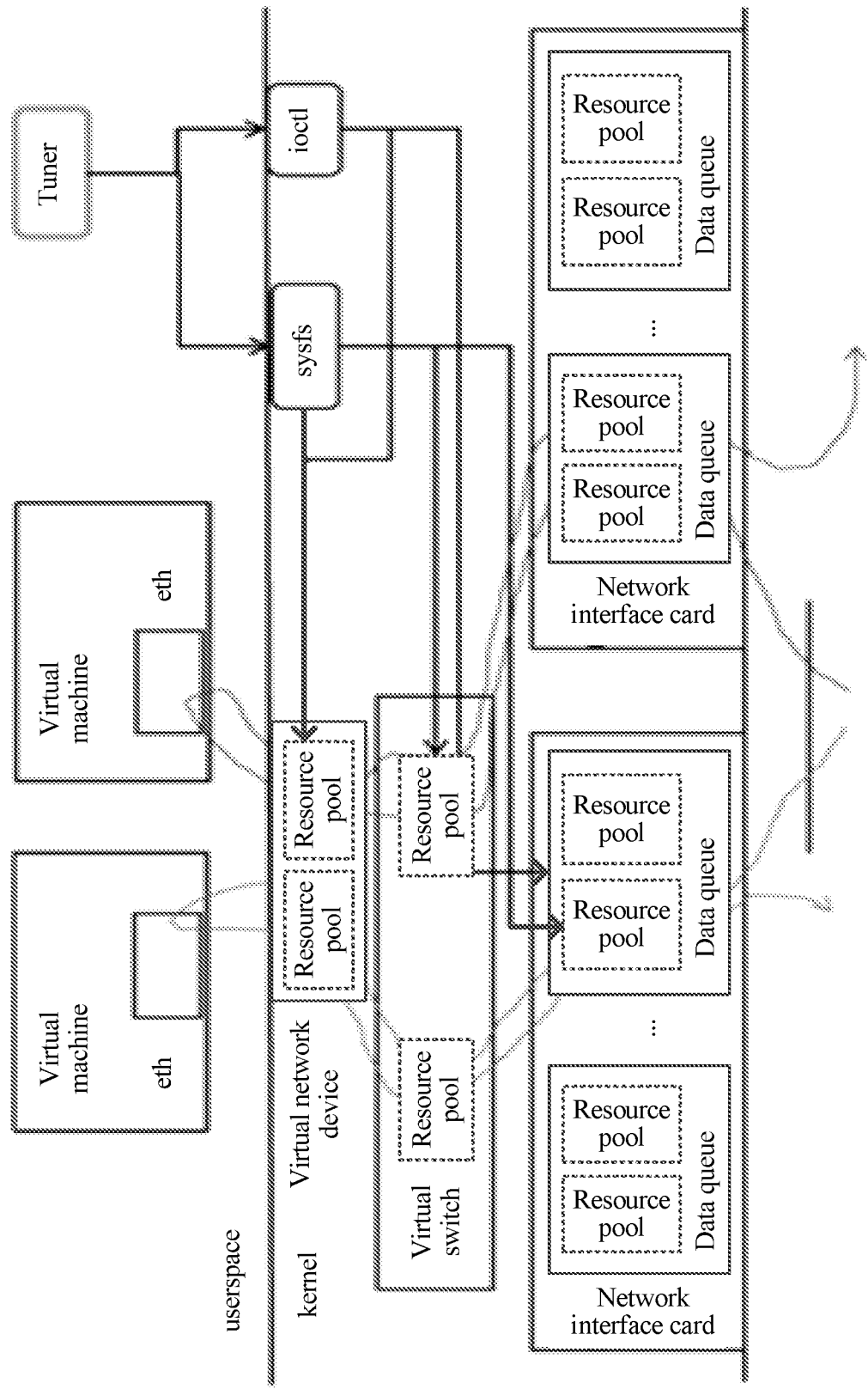
FIG. 1 is a schematic architectural diagram of a data transmission system according to an embodiment of the present invention.

Referring to FIG. 1, FIG. 1 is a schematic architectural diagram of a data transmission system according to an embodiment of the present invention. The data transmission system may include at least one virtual machine, at least one tuner, at least one network interface card, and at least one NUMA node.

Optionally, the data transmission system may further include a Virtual Switch (vSwitch), and the virtual switch is configured to be responsible for interaction between virtual machines and interaction between the virtual machine and the network interface card in a virtualization environment.

Optionally, the data transmission system may further include a virtual network device (tap), and the virtual network device may be a virtual network device in an operating system kernel. For example, the virtual machine may establish an Ethernet connection to the virtual switch by using the virtual network device.

For example, after receiving multiple first data blocks of one service that are sent by another physical machine, the network interface card may allocate the multiple first data blocks to a same data queue, and the data transmission system determines, according to a correspondence between the data queue and a resource pool of a NUMA node, a resource pool corresponding to the data queue in which the multiple first data blocks are located. The network interface card may forward the multiple first data blocks to the virtual machine by using the virtual switch and the virtual network device and by using a resource in the resource pool corresponding to the data queue in which the multiple first data blocks are located. Optionally, the data transmission system may sort address information of any first data block, calculate a hash value of the first data block by using sorted address information of the first data block, and establish a mapping relationship between the hash value and the NUMA node to which the resource pool corresponding to the data queue in which the first data block is located belongs. When the virtual network device receives multiple second data blocks of the service that are fed back by the virtual machine in response to the multiple first data blocks, the data transmission system may obtain address information of any second data block, sort the address information of the second data block, calculate a hash value of the second data block by using sorted address information of the second data block, determine, according to the mapping relationship between the hash value and the NUMA node, a NUMA node corresponding to the hash value of the second data block, use a resource pool of the NUMA node corresponding to the hash value of the second data block as a resource pool corresponding to the multiple second data blocks, and send the multiple second data blocks to the network interface card by using a resource in the resource pool.

For example, after receiving multiple first data blocks of one service that are sent by another physical machine, the network interface card may allocate the multiple first data blocks to a same data queue, and the network interface card may receive scheduling information that is generated by the tuner for the service, and forward the multiple first data blocks to the virtual machine by using the virtual switch and the virtual network device and by using a resource in a resource pool of a NUMA node designated in the scheduling information. Optionally, after receiving multiple second data blocks of the service that are fed back by the virtual machine in response to the multiple first data blocks, the virtual network device may send the multiple second data blocks to the network interface card by using the virtual switch and by using a resource in the resource pool of the NUMA node designated in the scheduling information. Optionally, the data transmission system may sort address information of any first data block, calculate a hash value of the first data block by using sorted address information of the first data block, and establish a mapping relationship between the hash value and the NUMA node to which the resource pool corresponding to the data queue in which the first data block is located belongs. When the virtual network device receives the multiple second data blocks of the service that are fed back by the virtual machine in response to the multiple first data blocks, the data transmission system may obtain address information of any second data block, sort the address information of the second data block, calculate a hash value of the second data block by using sorted address information of the second data block, determine, according to the mapping relationship between the hash value and the NUMA node, a NUMA node corresponding to the hash value of the second data block, use a resource pool of the NUMA node corresponding to the hash value of the second data block as a resource pool corresponding to the multiple second data blocks, and send the multiple second data blocks to the network interface card by using a resource in the resource pool.

Figure 2:
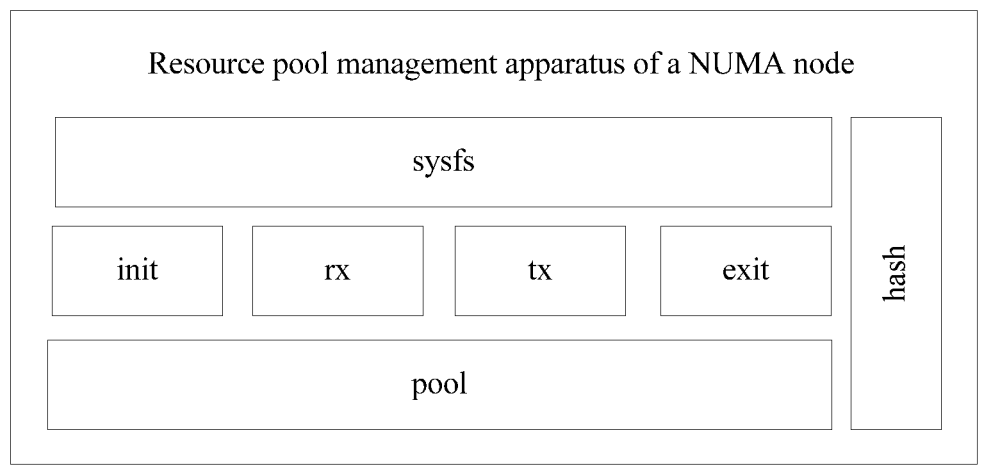
FIG. 2 is a schematic structural diagram of a resource pool management apparatus of a NUMA node according to an embodiment of the present invention.

Based on the schematic architectural diagram of the data transmission system shown in FIG. 1, FIG. 2 discloses a schematic structural diagram of a resource pool management apparatus of a NUMA node. The resource pool management apparatus of the NUMA node may run on a physical machine. As shown in FIG. 2, the resource pool management apparatus of the NUMA node may include at least an sysfs module, an init module, an rx module, a tx module, an exit module, a hash module, and a pool module.

The init module is configured to apply to an internal storage of the physical machine for a resource. For example, a preconfigured resource pool data capacity of the NUMA node is 30 MB, and the physical machine may apply to the internal storage for memory resources of a resource volume 30 MB by using the init module.

The pool module is configured to store the resource for which the internal storage of the physical machine is applied to.

The rx module is configured to: during data transmission, apply to a resource pool of the NUMA node for a resource in the resource pool.

The tx module is configured to: when data transmission is completed, release the resource for which the resource pool of the NUMA node is applied to and that is in the resource pool.

The exit module is configured to release the resource in the resource pool of the NUMA node.

The hash module is configured to: sort address information of a first data block, calculate a hash value of the first data block by using sorted address information of the first data block, and establish a mapping relationship between the hash value and a NUMA node to which a resource pool corresponding to the first data block belongs. Optionally, the hash module is further configured to: when a preset condition is met, delete the hash value and the NUMA node to which the resource pool corresponding to the hash value belongs. The preset condition may be deleting, at intervals of a preset time period such as one hour, a hash value stored in the hash module for the longest time and a NUMA node to which a resource pool corresponding to the hash value belongs and that is stored in the hash module for the longest time. Optionally, the preset condition may be that when a sum of data amounts of a hash value stored in the hash module and a node identifier of a NUMA node that is corresponding to the hash value and that is stored in the hash module reaches a preset threshold, for example, the preset threshold is 10 MB, and the sum of current data amounts of the hash module is 12 MB, the physical machine may delete, by using the hash module, a hash value stored for the longest time and a NUMA node to which a resource pool corresponding to the hash value belongs and that is stored in the hash module for the longest time.

The sysfs module is configured to collect statistics about a data capacity and current remaining space of the resource pool of the NUMA node.

Figure 3:
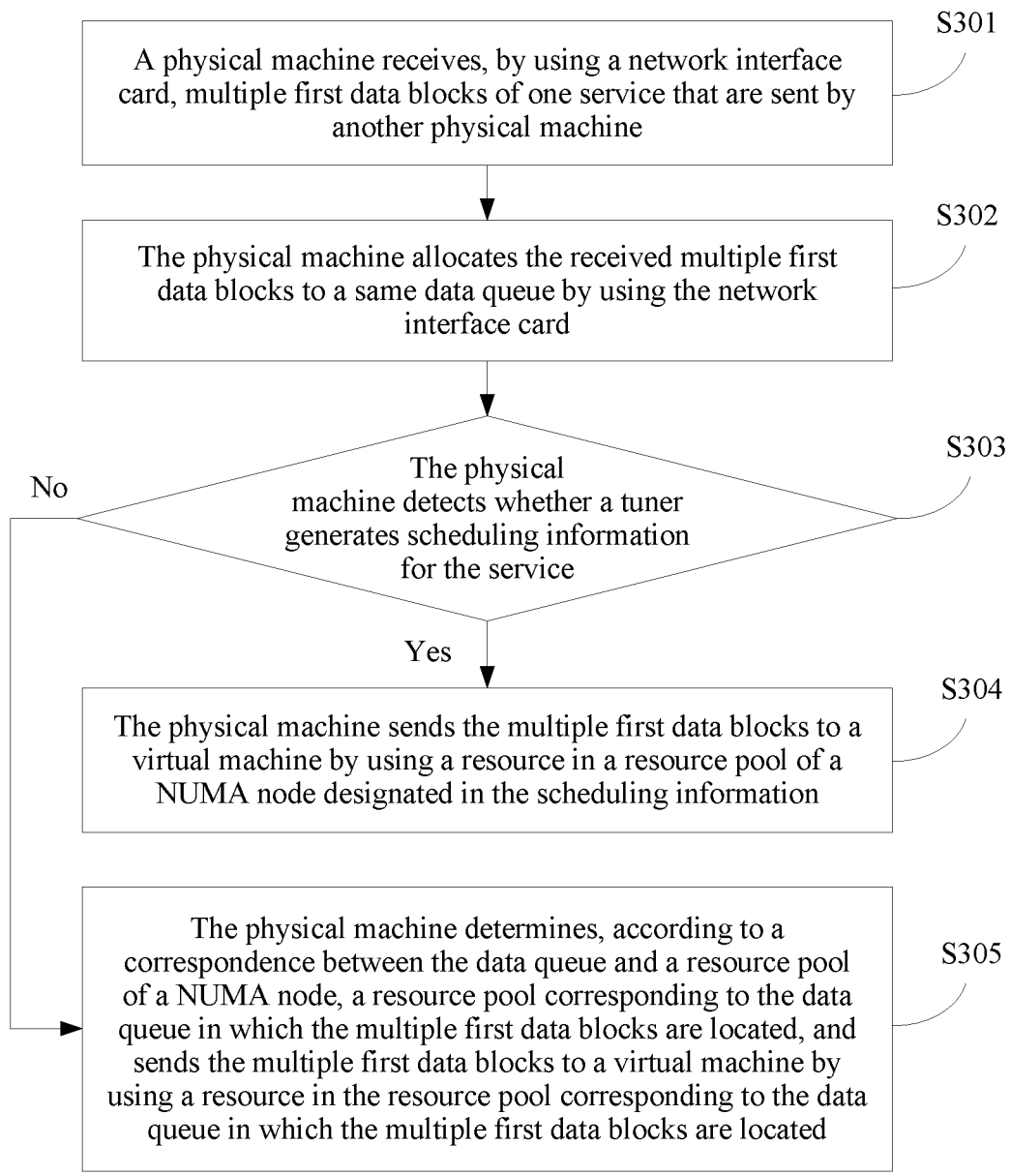
FIG. 3 is a schematic flowchart of a data transmission method according to an embodiment of the present invention.

Referring to FIG. 3, FIG. 3 is a schematic flowchart of a data transmission method according to an embodiment of the present invention. As shown in the figure, the data transmission method in this embodiment of the present application may include at least the following steps.

S301. A physical machine receives, by using a network interface card, multiple first data blocks of one service that are sent by another physical machine.

S302. The physical machine allocates the received multiple first data blocks to a same data queue by using the network interface card.

The physical machine may allocate the received multiple first data blocks to the same data queue by using the network interface card. For example, the network interface card is corresponding to a first data queue and a second data queue, and the physical machine may allocate the multiple first data blocks to the first data queue by using the network interface card.

S303. The physical machine detects whether a tuner generates scheduling information for the service.

Figure 4:
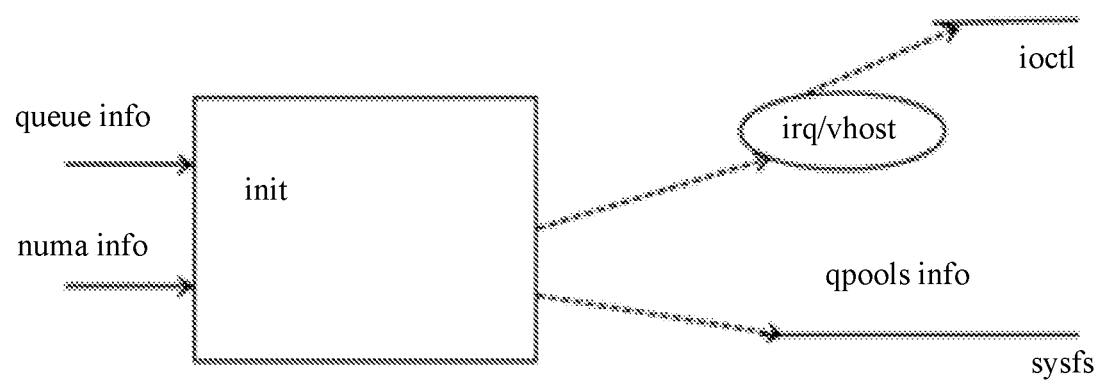
FIG. 4 is a schematic structural diagram of a resource pool management apparatus of a NUMA node according to another embodiment of the present invention.

After allocating the multiple first data blocks to the same data queue by using the network interface card, the physical machine may detect whether the tuner generates the scheduling information for the service. When the tuner generates the scheduling information for the service, the physical machine may further perform step S304; or when no scheduling information for the service is received, the physical machine may further perform step S305. The scheduling information may be used to instruct to schedule a resource from a resource pool of a designated NUMA node to process the multiple first data blocks. A schematic structural diagram of a resource pool management apparatus of a NUMA node shown in FIG. 4 is used as an example. A packet transceiver module may include a packet receiving module and a packet sending module. The packet receiving module may be an rx module, and the packet sending module may be a tx module. When receiving, by using the packet transceiver module, the scheduling information (that is, tuner info) that is generated by the tuner for the service, the physical machine may send the multiple first data blocks to a virtual machine by using the resource in the resource pool of the NUMA node designated in the scheduling information, and the physical machine may further collect statistics about a data capacity and current remaining space of the resource pool of the NUMA node by using an sysfs module.

For example, after the physical machine allocates the multiple first data blocks to the same data queue by using the network interface card, a user may control, by using the tuner, the physical machine to transmit the multiple first data blocks by using the resource in the resource pool of the designated NUMA node. For example, when the user expects the physical machine to transmit the multiple first data blocks of the service by using a resource in a resource pool of a first NUMA node, the user may submit a node identifier that is for the service and that is of the NUMA node to the tuner, and the tuner generates scheduling information according to the node identifier that is for the service and that is submitted by the user. The scheduling information is used to instruct to schedule the resource from the resource pool of the first NUMA node to process the multiple first data blocks. The physical machine may send the multiple first data blocks to the virtual machine by using the resource in the resource pool of the first NUMA node designated in the scheduling information.

Figure 5:
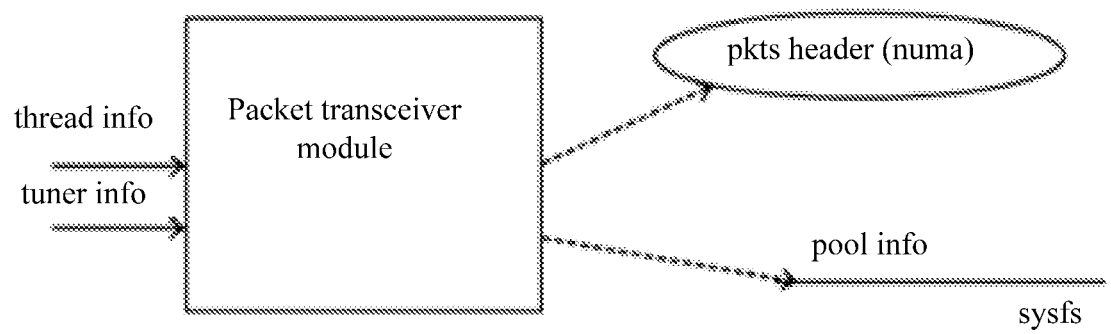
FIG. 5 is a schematic structural diagram of a resource pool management apparatus of a NUMA node according to another embodiment of the present invention.

In an optional embodiment, before detecting whether the tuner generates the scheduling information for the service, the physical machine may determine a quantity of NUMA nodes according to parameter information of a NUMA server, and apply to an internal storage for a resource pool that meets a requirement of the quantity. Each resource pool has a same data capacity. A schematic structural diagram of a resource pool management apparatus of a NUMA node shown in FIG. 5 is used as an example. The physical machine may determine the quantity of NUMA nodes according to the parameter information of the NUMA server. The physical machine may further obtain, by using an init module, a data queue corresponding to each network interface card in the physical machine, determine each obtained NUMA node, and then apply to the internal storage for a resource pool that meets a requirement of the quantity of NUMA nodes. For example, if the physical machine includes the first NUMA node and a second NUMA node, for the first NUMA node, the physical machine may apply to the internal storage for a resource pool of a data capacity 30 MB, and the resource pool includes resources of a resource volume 30 MB; and for the second NUMA node, the physical machine may further apply to the internal storage for a resource pool of a data capacity 30 MB, and the resource pool includes resources of a resource volume 30 MB. The physical machine may create a thread according to the multiple first data blocks cached in the data queue. Vhost indicates a sending thread, and irq indicates a receiving thread. The physical machine may interact with the virtual machine and the like in an ioctl (ioctl is a function that is in a device driver and that is for managing a device I/O channel) manner or a netlink (optical fiber transceiver) manner or the like. The physical machine may collect statistics about the data capacity and the current remaining space of the resource pool of the NUMA node by using the sysfs module.

S304. When the tuner generates the scheduling information for the service, send the multiple first data blocks to a virtual machine by using a resource in a resource pool of a NUMA node designated in the scheduling information.

Optionally, after determining, according to the scheduling information, the resource pool corresponding to the multiple first data blocks, the physical machine may detect whether a resource in a resource pool of a NUMA node other than the NUMA node to which the resource pool corresponding to the data queue in which the multiple first data blocks are located belongs is currently occupied. When the resource in the resource pool of the another NUMA node is currently unoccupied, the physical machine may delete the resource pool of the another NUMA node. For example, if the physical machine includes the first NUMA node and the second NUMA node, and the physical machine determines, according to the scheduling information, that the resource pool corresponding to the multiple first data blocks is the resource pool of the first NUMA node and that a resource in a resource pool of the second NUMA node is unoccupied, the physical machine may delete the resource pool of the second NUMA node.

Optionally, the physical machine may obtain the current remaining space of the determined resource pool, and determine a resource volume of resources that are required to transmit the multiple first data blocks. When the resource volume of the resources that are required to transmit the multiple first data blocks is less than or equal to the current remaining space of the determined resource pool, the physical machine may send the multiple first data blocks to the virtual machine by using the resource in the resource pool corresponding to the data queue in which the multiple first data blocks are located; or when the resource volume of the resources that are required to transmit the multiple first data blocks is greater than the current remaining space of the determined resource pool, the physical machine may update the resource pool corresponding to the multiple first data blocks. For example, if the resource volume of the resources that are required to transmit the multiple first data blocks is 10 MB, the current remaining space of the determined resource pool is 15 MB, and the resource volume of the resources that are required to transmit the multiple first data blocks is less than the current remaining space of the resource pool, the physical machine may determine that unoccupied resources in the resource pool are enough to carry the multiple first data blocks, and then the physical machine may send the multiple first data blocks to the virtual machine by using the resource in the resource pool. For another example, if the physical machine includes the first NUMA node and the second NUMA node, the resource volume of the resources that are required to transmit the multiple first data blocks is 10 MB, the resource pool corresponding to the multiple first data blocks is the resource pool of the first NUMA node, current remaining space of the resource pool is 5 MB, and the resource volume of the resources that are required to transmit the multiple first data blocks is greater than the current remaining space of the resource pool, the physical machine may determine that unoccupied resources in the resource pool cannot carry all of the multiple first data blocks, and then the physical machine may update the resource pool corresponding to the multiple first data blocks to the resource pool of the second NUMA node, and send the multiple first data blocks to the virtual machine by using a resource in the resource pool of the second NUMA node.

Optionally, when sending the multiple first data blocks to the virtual machine by using the resource in the determined resource pool, the physical machine may subtract, from the current remaining space of the resource pool, the resource volume of the resources that are required to transmit the multiple first data blocks, to update the current remaining space of the resource pool corresponding to the data queue in which the multiple first data blocks are located.

Optionally, the physical machine may obtain a proportion of the current remaining space of the determined resource pool to the data capacity of the resource pool, and when the proportion is less than a preset proportion threshold, the physical machine may update the resource pool corresponding to the multiple first data blocks, and send the multiple first data blocks to the virtual machine by using a resource in an updated resource pool corresponding to the multiple first data blocks. For example, the preset proportion threshold may be 25%, and when the data capacity of the determined resource pool is 30 MB and the current remaining space of the resource pool is 3 MB, the physical machine may determine that the proportion of the current remaining space of the resource pool to the data capacity of the resource pool is 10%, the proportion is less than the preset proportion threshold, and the physical machine may update the resource pool corresponding to the multiple first data blocks, and send the multiple first data blocks to the virtual machine by using the resource in the updated resource pool corresponding to the multiple first data blocks.

Optionally, after successfully sending the multiple first data blocks to the virtual machine by using the resource in the determined resource pool, the physical machine may release the resource in the determined resource pool and then update the current remaining space of the resource pool. For example, if the resource volume of the resources that are required to transmit the multiple first data blocks is 10 MB, and the current remaining space of the determined resource pool is 15 MB, when successfully sending the multiple first data blocks to the virtual machine by using the resource in the resource pool, the physical machine may update the current remaining space of the resource pool to 5 MB, and after successfully sending the multiple first data blocks to the virtual machine by using the resource in the resource pool, the physical machine may release resources of a resource volume 10 MB in the resource pool, and update the current remaining space of the resource pool to 15 MB.

S305. When the tuner does not generate the scheduling information, determine, according to a correspondence between the data queue and a resource pool of a NUMA node, a resource pool corresponding to the data queue in which the multiple first data blocks are located, and send the multiple first data blocks to a virtual machine by using a resource in the resource pool corresponding to the data queue in which the multiple first data blocks are located.

When the tuner does not generate the scheduling information for the service, the physical machine may determine, according to the correspondence between the data queue and the resource pool of the NUMA node, the resource pool corresponding to the data queue in which the multiple first data blocks are located, and send the multiple first data blocks to the virtual machine by using the resource in the resource pool corresponding to the data queue in which the multiple first data blocks are located.

In an optional embodiment, the physical machine may establish the correspondence between the data queue and the resource pool of the NUMA node. A resource pool of one NUMA node may be corresponding to multiple data queues, or optionally, a resource pool of one NUMA node may be corresponding to one data queue, and this is not specifically limited in this embodiment of the present invention. For example, when a quantity of data queues is less than or equal to a quantity of NUMA nodes, the physical machine may establish correspondences between different data queues and resource pools of different NUMA nodes. For example, if the physical machine includes a first data queue and a second data queue, and the physical machine further includes the first NUMA node and the second NUMA node, the physical machine may establish a correspondence between the first data queue and the resource pool of the first NUMA node and a correspondence between the second data queue and a resource pool of the second NUMA node. For another example, when a quantity of data queues is greater than a quantity of NUMA nodes, the physical machine may establish correspondences between a resource pool of one NUMA node and multiple data queues. For example, if the physical machine includes a first data queue, a second data queue, and a third data queue, and the physical machine further includes the first NUMA node and the second NUMA node, the physical machine may establish a correspondence between the first data queue and the resource pool of the first NUMA node, a correspondence between the second data queue and a resource pool of the second NUMA node, and a correspondence between the third data queue and the resource pool of the second NUMA node.

Optionally, the physical machine may further sort address information of any first data block, calculate a hash value of the first data block by using sorted address information of the first data block, and establish a mapping relationship between the hash value and the NUMA node to which the resource pool corresponding to the data queue in which the first data block is located belongs.

In the data transmission method shown in FIG. 3, the physical machine receives, by using the network interface card, the multiple first data blocks of the service that are sent by the another physical machine, and allocates the received multiple first data blocks to the same data queue by using the network interface card; and when the tuner generates the scheduling information for the service, the physical machine sends the multiple first data blocks to the virtual machine by using the resource in the resource pool of the NUMA node designated in the scheduling information; or when tuner does not generate the scheduling information, the physical machine determines, according to the correspondence between the data queue and the resource pool of the NUMA node, the resource pool corresponding to the data queue in which the multiple first data blocks are located, and sends the multiple first data blocks to the virtual machine by using the resource in the resource pool corresponding to the data queue in which the multiple first data blocks are located, so as to ensure that resources used for the multiple first data blocks are located in a resource pool of a same NUMA node, reduce cross-NUMA node operations, and improve data transmission performance.

Figure 6:
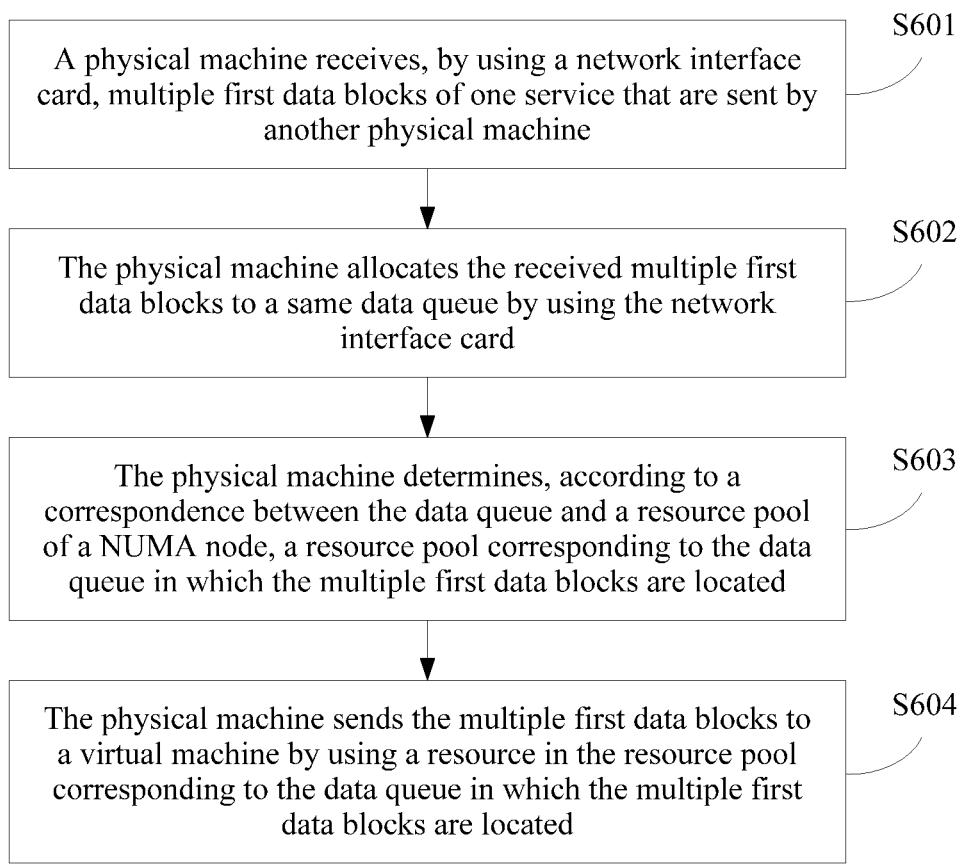
FIG. 6 is a schematic flowchart of a data transmission method according to another embodiment of the present invention.

Referring to FIG. 6, FIG. 6 is a schematic flowchart of a data transmission method according to an embodiment of the present invention. As shown in the figure, the data transmission method in this embodiment of the present application may include at least the following steps.

S601. A physical machine receives, by using a network interface card, multiple first data blocks of one service that are sent by another physical machine.

S602. The physical machine allocates the received multiple first data blocks to a same data queue by using the network interface card.

S603. The physical machine determines, according to a correspondence between the data queue and a resource pool of a NUMA node, a resource pool corresponding to the data queue in which the multiple first data blocks are located.

In an optional embodiment, before determining, according to the correspondence between the data queue and the resource pool of the NUMA node, the resource pool corresponding to the data queue in which the multiple first data blocks are located, the physical machine may determine a quantity of NUMA nodes according to parameter information of a NUMA server, and apply to an internal storage for a resource pool that meets a requirement of the quantity. Each resource pool has a same data capacity. A schematic structural diagram of a resource pool management apparatus of a NUMA node shown in FIG. 5 is used as an example. The physical machine may determine the quantity of NUMA nodes according to the parameter information of the NUMA server. The physical machine may further obtain, by using an init module, a data queue corresponding to each network interface card in the physical machine, determine each obtained NUMA node, and then apply to the internal storage for a resource pool that meets a requirement of the quantity of NUMA nodes. For example, if the physical machine includes a first NUMA node and a second NUMA node, for the first NUMA node, the physical machine may apply to the internal storage for a resource pool of a data capacity 30 MB, and the resource pool includes resources of a resource volume 30 MB; and for the second NUMA node, the physical machine may further apply to the internal storage for a resource pool of a data capacity 30 MB, and the resource pool includes resources of a resource volume 30 MB. The physical machine may create a thread according to the multiple first data blocks cached in the data queue. Vhost indicates a sending thread, and irq indicates a receiving thread. The physical machine may interact with a virtual machine and the like in an ioctl manner or a netlink manner or the like. The physical machine may collect statistics about a data capacity and current remaining space of the resource pool of the NUMA node by using an sysfs module.

In an optional embodiment, the physical machine may establish the correspondence between the data queue and the resource pool of the NUMA node. A resource pool of one NUMA node may be corresponding to multiple data queues, or optionally, a resource pool of one NUMA node may be corresponding to one data queue, and this is not specifically limited in this embodiment of the present invention. For example, when a quantity of data queues is less than or equal to a quantity of NUMA nodes, the physical machine may establish correspondences between different data queues and resource pools of different NUMA nodes. For example, if the physical machine includes a first data queue and a second data queue, and the physical machine further includes the first NUMA node and the second NUMA node, the physical machine may establish a correspondence between the first data queue and a resource pool of the first NUMA node and a correspondence between the second data queue and a resource pool of the second NUMA node. For another example, when a quantity of data queues is greater than a quantity of NUMA nodes, the physical machine may establish correspondences between a resource pool of one NUMA node and multiple data queues. For example, if the physical machine includes a first data queue, a second data queue, and a third data queue, and the physical machine further includes the first NUMA node and the second NUMA node, the physical machine may establish a correspondence between the first data queue and a resource pool of the first NUMA node, a correspondence between the second data queue and a resource pool of the second NUMA node, and a correspondence between the third data queue and the resource pool of the second NUMA node.

Optionally, after determining, according to the correspondence between the data queue and the resource pool of the NUMA node, the resource pool corresponding to the data queue in which the multiple first data blocks are located, the physical machine may detect whether a resource in a resource pool of a NUMA node other than the NUMA node to which the resource pool corresponding to the data queue in which the multiple first data blocks are located belongs is currently occupied. When the resource in the resource pool of the another NUMA node is currently unoccupied, the physical machine may delete the resource pool of the another NUMA node. For example, if the physical machine includes the first NUMA node and the second NUMA node, and the physical machine determines, according to the scheduling information, that the resource pool corresponding to the multiple first data blocks is the resource pool of the first NUMA node and that a resource in the resource pool of the second NUMA node is unoccupied, the physical machine may delete the resource pool of the second NUMA node.

Optionally, the physical machine may obtain the current remaining space of the determined resource pool, and determine a resource volume of resources that are required to transmit the multiple first data blocks. When the resource volume of the resources that are required to transmit the multiple first data blocks is less than or equal to the current remaining space of the determined resource pool, the physical machine may send the multiple first data blocks to the virtual machine by using the resource in the resource pool corresponding to the data queue in which the multiple first data blocks are located; or when the resource volume of the resources that are required to transmit the multiple first data blocks is greater than the current remaining space of the determined resource pool, the physical machine may update the resource pool corresponding to the multiple first data blocks. For example, if the resource volume of the resources that are required to transmit the multiple first data blocks is 10 MB, the current remaining space of the determined resource pool is 15 MB, and the resource volume of the resources that are required to transmit the multiple first data blocks is less than the current remaining space of the resource pool, the physical machine may determine that unoccupied resources in the resource pool are enough to carry the multiple first data blocks, and then the physical machine may send the multiple first data blocks to the virtual machine by using the resource in the resource pool. For another example, if the physical machine includes the first NUMA node and the second NUMA node, the resource volume of the resources that are required to transmit the multiple first data blocks is 10 MB, the resource pool corresponding to the multiple first data blocks is the resource pool of the first NUMA node, current remaining space of the resource pool is 5 MB, and the resource volume of the resources that are required to transmit the multiple first data blocks is greater than the current remaining space of the resource pool, the physical machine may determine that unoccupied resources in the resource pool cannot carry all of the multiple first data blocks, and then the physical machine may update the resource pool corresponding to the multiple first data blocks to the resource pool of the second NUMA node, and send the multiple first data blocks to the virtual machine by using a resource in the resource pool of the second NUMA node.

S604. The physical machine sends the multiple first data blocks to a virtual machine by using a resource in the resource pool corresponding to the data queue in which the multiple first data blocks are located.

Optionally, when sending the multiple first data blocks to the virtual machine by using the resource in the determined resource pool, the physical machine may subtract, from the current remaining space of the resource pool, the resource volume of the resources that are required to transmit the multiple first data blocks, to update the current remaining space of the resource pool corresponding to the data queue in which the multiple first data blocks are located.

Optionally, the physical machine may obtain a proportion of the current remaining space of the determined resource pool to the data capacity of the resource pool, and when the proportion is less than a preset proportion threshold, the physical machine may update the resource pool corresponding to the multiple first data blocks, and send the multiple first data blocks to the virtual machine by using a resource in an updated resource pool corresponding to the multiple first data blocks. For example, the preset proportion threshold may be 25%, and when the data capacity of the determined resource pool is 30 MB and the current remaining space of the resource pool is 3 MB, the physical machine may determine that the proportion of the current remaining space of the resource pool to the data capacity of the resource pool is 10%, the proportion is less than the preset proportion threshold, and the physical machine may update the resource pool corresponding to the multiple first data blocks, and send the multiple first data blocks to the virtual machine by using the resource in the updated resource pool corresponding to the multiple first data blocks.

Optionally, after successfully sending the multiple first data blocks to the virtual machine by using the resource in the determined resource pool, the physical machine may release the resource in the determined resource pool and then update the current remaining space of the resource pool. For example, if the resource volume of the resources that are required to transmit the multiple first data blocks is 10 MB, and the current remaining space of the determined resource pool is 15 MB, when successfully sending the multiple first data blocks to the virtual machine by using the resource in the resource pool, the physical machine may update the current remaining space of the resource pool to 5 MB, and after successfully sending the multiple first data blocks to the virtual machine by using the resource in the resource pool, the physical machine may release resources of a resource volume 10 MB in the resource pool, and update the current remaining space of the resource pool to 15 MB.

Optionally, the physical machine may further sort address information of any first data block, calculate a hash value of the first data block by using sorted address information of the first data block, and establish a mapping relationship between the hash value and the NUMA node to which the resource pool corresponding to the data queue in which the first data block is located belongs.

In the data transmission method shown in FIG. 6, the physical machine receives, by using the network interface card, the multiple first data blocks of the service that are sent by the another physical machine, allocates the received multiple first data blocks to the same data queue by using the network interface card, determines, according to the correspondence between the data queue and the resource pool of the NUMA node, the resource pool corresponding to the data queue in which the multiple first data blocks are located, and sends the multiple first data blocks to the virtual machine by using the resource in the resource pool corresponding to the data queue in which the multiple first data blocks are located, so as to ensure that resources used for the multiple first data blocks are located in a resource pool of a same NUMA node, reduce cross-NUMA node operations, and improve data transmission performance.

Figure 7:
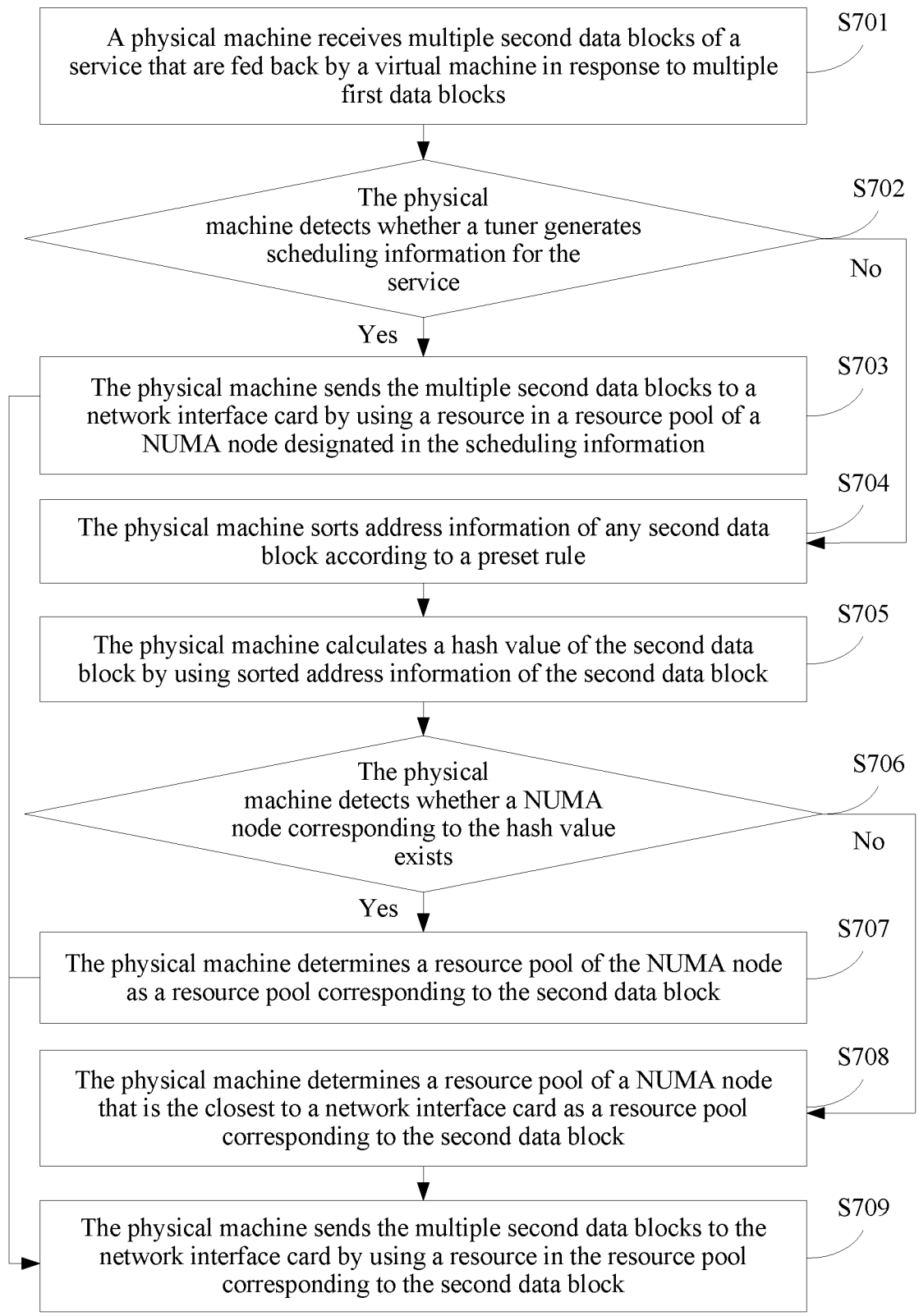
FIG. 7 is a schematic flowchart of a data transmission method according to another embodiment of the present invention.

Referring to FIG. 7, FIG. 7 is a schematic flowchart of a data transmission method according to an embodiment of the present invention. As shown in the figure, the data transmission method in this embodiment of the present application may include at least the following steps:

S701. A physical machine receives multiple second data blocks of a service that are fed back by a virtual machine in response to multiple first data blocks.

S702. The physical machine detects whether a tuner generates scheduling information for the service.

The physical machine may detect whether the tuner generates the scheduling information for the service. When the tuner generates the scheduling information for the service, the physical machine may further perform step S703; or when tuner does not generate the scheduling information for the service, the physical machine may further perform step S704.

S703. When the tuner generates the scheduling information for the service, the physical machine sends the multiple second data blocks to a network interface card by using a resource in a resource pool of a NUMA node designated in the scheduling information.

For example, to reduce cross-NUMA node operations, the physical machine needs to ensure that a resource used for transmitting the multiple first data blocks and a resource used for transmitting the multiple second data blocks are located in a resource pool of a same NUMA node. Based on this, a user may control, by using the tuner, the physical machine to transmit the multiple second data blocks by using a resource in a resource pool to which a resource used for processing the multiple first data blocks belongs. For example, the physical machine transmits the multiple first data blocks by using a resource in a resource pool of a first NUMA node, the user may submit a node identifier of the NUMA node to the tuner, and the tuner generates scheduling information according to the node identifier of the NUMA node that is submitted by the user. The scheduling information is used to instruct to schedule the resource from the resource pool of the first NUMA node to process the multiple first data blocks. The physical machine may send the multiple second data blocks to the network interface card by using the resource in the resource pool of the NUMA node designated in the scheduling information.

Optionally, after sending the multiple second data blocks to the network interface card by using the resource in the resource pool of the NUMA node designated in the scheduling information, the physical machine may sort address information of any second data block, calculate a hash value of the second data block by using sorted address information of the second data block, and establish a mapping relationship between the hash value and a NUMA node to which a resource pool corresponding to the second data block belongs, to update the stored hash value and a stored NUMA node corresponding to the hash value.

Optionally, the physical machine may obtain current remaining space of a resource pool corresponding to a thread to which second data block belongs, and determine a resource volume of resources that are required to transmit the second data block. When the resource volume of the resources that are required to transmit the second data block is less than or equal to the current remaining space of the resource pool, the physical machine may send the second data block to the network interface card by using a resource in the resource pool; or when the resource volume of the resources that are required to transmit the second data block is greater than the current remaining space of the resource pool, the physical machine may update the resource pool corresponding to the thread to which the second data block belongs.

Optionally, when sending the multiple second data blocks to the network interface card by using the resource in the resource pool of the NUMA node designated in the scheduling information, the physical machine may subtract, from the current remaining space of the resource pool, the resource volume of the resources that are required to transmit the multiple second data blocks, to update the current remaining space of the resource pool of the designated NUMA node.

Optionally, the physical machine may obtain a proportion of the current remaining space of the resource pool of the designated NUMA node to a data capacity of the resource pool, and when the proportion is less than a preset proportion threshold, the physical machine may update the resource pool corresponding to the multiple second data blocks, and send the multiple second data blocks to the network interface card by using a resource in an updated resource pool corresponding to the multiple second data blocks.

Optionally, after successfully sending the multiple second data blocks to the network interface card by using the resource in the resource pool of the designated NUMA node, the physical machine may release the resource in the resource pool, and then update the current remaining space of the resource pool.

S704. When the tuner does not generate the scheduling information, the physical machine sorts address information of any second data block according to a preset rule.

When the tuner does not generate the scheduling information, the physical machine may sort a source address and a destination address of the second data block in descending order (or in ascending order).

S705. The physical machine calculates a hash value of the second data block by using sorted address information of the second data block.

S706. The physical machine detects whether a NUMA node corresponding to the hash value exists.

The physical machine may detect whether the NUMA node corresponding to the hash value exists. When the NUMA node corresponding to the hash value exists, the physical machine may further perform step S707; or when there is no NUMA node corresponding to the hash value, the physical machine may further perform step S708.

The multiple second data blocks are data that is fed back by the virtual machine in response to the multiple first data blocks, a source address of the second data block is the same as a destination address of the first data block, and a destination address of the second data block is the same as a source address of the first data block. The sorted address information of the second data block is the same as sorted address information of the first data block, and the obtained hash value of the second data block is also the same as an obtained hash value of the first data block. The physical machine obtains a NUMA node corresponding to the hash value of the first data block, and uses a resource pool of the NUMA node as the resource pool corresponding to the second data block. The resource pool corresponding to the second data block is the same as the resource pool corresponding to the first data block.

S707. When the NUMA node corresponding to the hash value exists, the physical machine determines a resource pool of the NUMA node as a resource pool corresponding to the second data block.

S708. When there is no NUMA node corresponding to the hash value, the physical machine determines a resource pool of a NUMA node that is the closest to a network interface card as a resource pool corresponding to the second data block.

S709. The physical machine sends the multiple second data blocks to the network interface card by using a resource in the resource pool corresponding to the second data block.

In the data transmission method shown in FIG. 7, the physical machine receives the multiple second data blocks of the service that are fed back by the virtual machine in response to the multiple first data blocks. When the tuner generates the scheduling information for the service, the physical machine sends the multiple second data blocks to the network interface card by using the resource in the resource pool of the NUMA node designated in the scheduling information; or when tuner does not generate the scheduling information, the physical machine sorts the address information of the any second data block according to the preset rule, and calculates the hash value of the second data block by using the sorted address information of the second data block. When the NUMA node corresponding to the hash value exists, the physical machine determines the resource pool of the NUMA node as the resource pool corresponding to the second data block; or when there is no NUMA node corresponding to the hash value, the physical machine determines the resource pool of the NUMA node that is the closest to the network interface card as the resource pool corresponding to the second data block, and sends the multiple second data blocks to the network interface card by using the resource in the resource pool corresponding to the second data block, so as to ensure that the resource used for the multiple second data blocks and the resource used for the multiple first data blocks are located in a resource pool of a same NUMA node, reduce cross-NUMA node operations, and improve data transmission performance.

Figure 8:
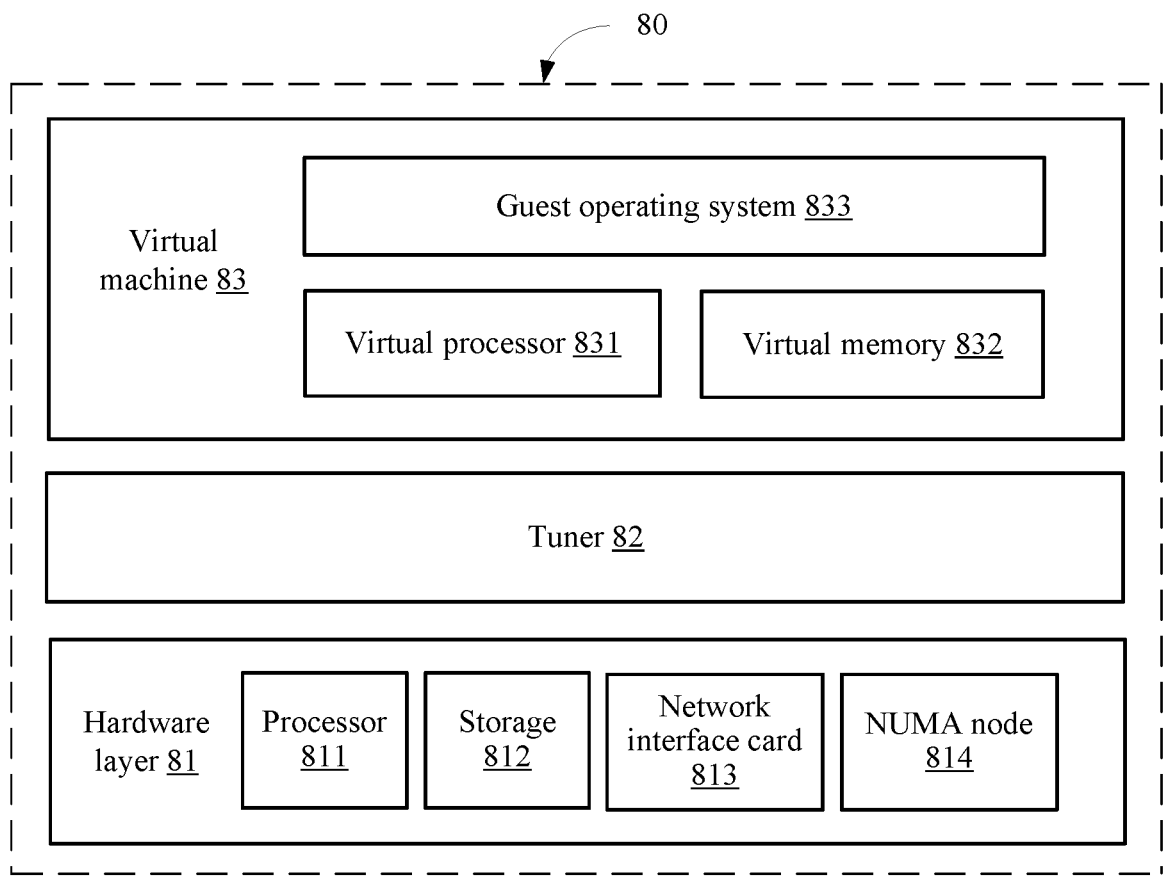
FIG. 8 is a schematic structural diagram of a data transmission apparatus according to an embodiment of the present invention.

Referring to FIG. 8, FIG. 8 is a schematic structural diagram of a physical machine according to an embodiment of the present invention. As shown in FIG. 8, the physical machine 80 may include a hardware layer 81, and a tuner 82 and one or more virtual machines 83 that run above the hardware layer 81. The hardware layer 81 may include a processor 811, a storage 812, one or more network interface cards 813, and one or more NUMA nodes 814.

There may be one or more processors 811, and the processor 811 may be a CPU, a network processor (NP), or the like.

For the network interface card 813, refer to the NIC shown in FIG. 1. The network interface card 813 may be a network adapter or a physical network interface card, and is configured to connect to any connectable network, for example, the Internet and an enterprise network. The network interface card 813 is corresponding to a data queue.

A resource pool is accordingly configured for the NUMA node 814, and the resource pool may include a memory resource.

The storage 812 may be specifically configured to store a correspondence between the data queue and the resource pool of the NUMA node. The storage 812 may include a volatile memory, for example, a random access memory (RAM); the storage may include a non-volatile memory, for example, a read-only memory (ROM), a flash memory, a hard disk drive (HDD), or a solid-state drive (SSD); or the storage may include a combination of the foregoing types of storages.

For the tuner 82, refer to the tuner shown in FIG. 1. A user may use the tuner 82 to generate scheduling information, and the scheduling information may be used to instruct to schedule a resource from a resource pool of a designated NUMA node 814 to process multiple first data blocks or multiple second data blocks.

The virtual machine 83 may include a virtual processor 831, a virtual memory 832, and a guest operating system (Guest OS) 833. The guest operating system 833 is an operating system that runs above virtual devices such as the virtual processor 831 and the virtual memory 832.

The physical machine 80 serves as a management layer, and is configured to: complete managing and allocating a hardware resource, present a virtual hardware platform to the virtual machine 83, and implement scheduling and isolation of the virtual machine 83. The virtual hardware platform provides various hardware resources for all virtual machines 83 that run on the virtual hardware platform, for example, provides a virtual processor, a memory, a virtual disk, or a virtual network interface card. The virtual disk may be corresponding to a file or a logical block device in the physical machine 80. The virtual machine 83 runs on the virtual hardware platform prepared by the physical machine 80 for the virtual machine 83, and one or more virtual machines 83 run on the physical machine 80.

For the virtual machine 83, one or more virtual computers can be simulated on one physical computer by using virtual machine software. The virtual computers operate like real computers. For the virtual machine 83, refer to the VM shown in FIG. 1. An operating system and an application program may be installed on the virtual machine 83, and the virtual machine 83 may further access a network resource. For an application program that runs on the virtual machine 83, the virtual machine 83 operates like a real computer.

The processor 811 invokes program code stored in the storage 812, to perform the following operations:

receiving, by the processor 811 by using the network interface card 813, multiple first data blocks of one service that are sent by another physical machine;

allocating, by the processor 811, the received multiple first data blocks to a same data queue by using the network interface card 813; and when the tuner 82 generates scheduling information for the service, sending, by the processor 811, the multiple first data blocks to the virtual machine 83 by using a resource in a resource pool of a NUMA node designated in the scheduling information, where the scheduling information is used to instruct to schedule the resource from the resource pool of the designated NUMA node to process the multiple first data blocks; or when the tuner 82 does not generate scheduling information, determining, by the processor 811 according to a correspondence between the data queue and a resource pool of a NUMA node, a resource pool corresponding to the data queue in which the multiple first data blocks are located, and sending the multiple first data blocks to the virtual machine 83 by using a resource in the resource pool corresponding to the data queue in which the multiple first data blocks are located.

Optionally, after sending the multiple first data blocks to the virtual machine 83 by using the resource in the resource pool of the NUMA node designated in the scheduling information, the processor 811 may further perform the following operations:

receiving, by the processor 811, multiple second data blocks of the service that are fed back by the virtual machine 83 in response to the multiple first data blocks; and sending, by the processor 811, the multiple second data blocks to the network interface card 813 by using a resource in the resource pool of the NUMA node designated in the scheduling information, where the resource pool to which the resource scheduled for processing the multiple second data blocks belongs is the same as the resource pool to which the resource scheduled for processing the multiple first data blocks belongs.

Optionally, after sending the multiple first data blocks to the virtual machine 83 by using the resource in the resource pool corresponding to the data queue in which the first data blocks are located, the processor 811 may further perform the following operations:

receiving, by the processor 811, multiple second data blocks of the service that are fed back by the virtual machine 83 in response to the multiple first data blocks;

determining, by the processor 811, a resource pool corresponding to the multiple second data blocks, where the resource pool corresponding to the multiple second data blocks is the same as the resource pool corresponding to the multiple first data blocks; and sending, by the processor 811, the multiple second data blocks to the network interface card 813 by using a resource in the resource pool corresponding to the multiple second data blocks.

Optionally, after determining, according to the correspondence between the data queue and the resource pool of the NUMA node, the resource pool corresponding to the data queue in which the multiple first data blocks are located, the processor 811 may further perform the following operations:

sorting, by the processor 811, address information of any one of the multiple first data blocks according to a preset rule, where the address information of the first data block includes a source address and a destination address, source addresses of all of the multiple first data blocks are the same, and destination addresses of all of the multiple first data blocks are the same;

calculating, by the processor 811, a hash value of the first data block by using sorted address information of the first data block; and establishing, by the processor 811, a second mapping relationship, where the second mapping relationship is a mapping relationship between the hash value and the NUMA node to which the resource pool corresponding to the data queue in which the first data block is located belongs.

Further, that the processor 811 sends the multiple first data blocks to the virtual machine 83 by using the resource in the resource pool corresponding to the data queue in which the first data blocks are located may be specifically:

sending, by the processor 811, the multiple first data blocks and the second mapping relationship to the virtual machine 83 by using a resource in the resource pool corresponding to the data queue in which the multiple first data blocks are located.

Optionally, that the processor 811 determines the resource pool corresponding to the multiple second data blocks may be specifically:

sorting, by the processor 811, address information of any one of the multiple second data blocks according to the preset rule, where the address information of the second data block includes a source address and a destination address, a source address of each of the multiple second data blocks is the same as a destination address of each first data block, and a destination address of each of the multiple second data blocks is the same as a source address of each first data block;

calculating, by the processor 811, a hash value of the second data block by using sorted address information of the second data block, where the hash value of the first data is the same as the hash value of the second data;

determining, by the processor 811 according to the second mapping relationship, a NUMA node corresponding to the hash value of the second data block; and using, by the processor 811, a resource pool of the NUMA node corresponding to the hash value of the second data block as the resource pool corresponding to the multiple second data blocks.

Specifically, the physical machine described in this embodiment of the present application may be configured to implement some or all procedures in the embodiments of the data transmission methods described in the present application with reference to FIG. 3, FIG. 6, and FIG. 7.

Figure 9:
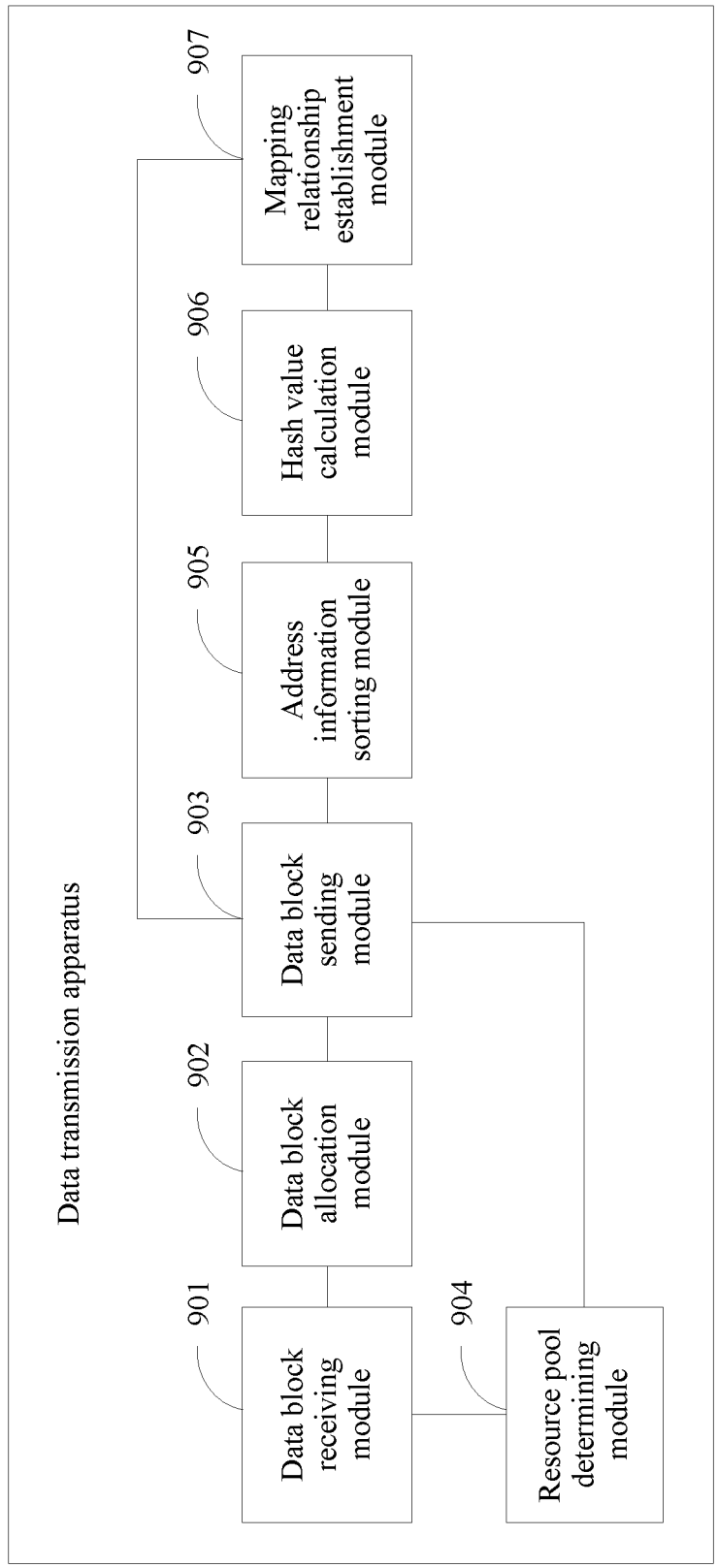
FIG. 9 is a schematic structural diagram of a data transmission apparatus according to an embodiment of the present invention.

Referring to FIG. 9, FIG. 9 is a schematic structural diagram of a data transmission apparatus according to an embodiment of the present invention. The data transmission apparatus provided in this embodiment of the present application may be applied to a physical machine, a virtual machine and a tuner run on the physical machine, and the physical machine includes a network interface card and a NUMA node. For the data transmission apparatus provided in this embodiment of the present invention, refer to the processor 811 in FIG. 8. As shown in the figure, the data transmission apparatus in this embodiment of the present application may include at least a data block receiving module 901, a data block allocation module 902, and a data block sending module 903.

The data block receiving module 901 is configured to receive, by using the network interface card, multiple first data blocks of one service that are sent by another physical machine.

The data block allocation module 902 is configured to allocate the received multiple first data blocks to a same data queue by using the network interface card. The data queue is corresponding to the network interface card.

The data block sending module 903 is configured to: when the tuner generates scheduling information for the service, send the multiple first data blocks to the virtual machine by using a resource in a resource pool of a NUMA node designated in the scheduling information. The scheduling information is used to instruct to schedule the resource from the resource pool of the designated NUMA node to process the multiple first data blocks.

The data block sending module 903 is further configured to: when the tuner does not generate the scheduling information, determine, according to a correspondence between the data queue and a resource pool of a NUMA node, a resource pool corresponding to the data queue in which the multiple first data blocks are located, and send the multiple first data blocks to the virtual machine by using a resource in the resource pool corresponding to the data queue in which the multiple first data blocks are located.

Optionally, the data block receiving module 901 is further configured to: after the data block sending module 903 sends the multiple first data blocks to the virtual machine by using the resource in the resource pool of the NUMA node designated in the scheduling information, receive multiple second data blocks of the service that are fed back by the virtual machine in response to the multiple first data blocks.

The data block sending module 903 is further configured to send the multiple second data blocks to the network interface card by using a resource in the resource pool of the NUMA node designated in the scheduling information. The resource pool to which the resource scheduled for processing the multiple second data blocks belongs is the same as the resource pool to which the resource scheduled for processing the multiple first data blocks belongs.

Optionally, the data block receiving module 901 is further configured to: after the data block sending module 903 sends the multiple first data blocks to the virtual machine by using the resource in the resource pool corresponding to the data queue in which the first data blocks are located, receive multiple second data blocks of the service that are fed back by the virtual machine in response to the multiple first data blocks.

The data transmission apparatus in this embodiment of the present application may further include:

a resource pool determining module 904, configured to determine a resource pool corresponding to the multiple second data blocks, where the resource pool corresponding to the multiple second data blocks is the same as the resource pool corresponding to the multiple first data blocks.

The data block sending module 903 is further configured to send the multiple second data blocks to the network interface card by using a resource in the resource pool corresponding to the multiple second data blocks.

Optionally, the data transmission apparatus in this embodiment of the present application may further include:

an address information sorting module 905, configured to: after the data block sending module 903 determines, according to the correspondence between the data queue and the resource pool of the NUMA node, the resource pool corresponding to the data queue in which the multiple first data blocks are located, sort address information of any one of the multiple first data blocks according to a preset rule, where the address information of the first data block includes a source address and a destination address, source addresses of all of the multiple first data blocks are the same, and destination addresses of all of the multiple first data blocks are the same;

a hash value calculation module 906, configured to calculate a hash value of the first data block by using sorted address information of the first data block; and a mapping relationship establishment module 907, configured to establish a second mapping relationship, where the second mapping relationship is a mapping relationship between the hash value and the NUMA node to which the resource pool corresponding to the data queue in which the first data block is located belongs.

Further, that the data block sending module 903 sends the multiple first data blocks to the virtual machine by using the resource in the resource pool corresponding to the data queue in which the first data blocks are located includes:

sending the multiple first data blocks and the second mapping relationship to the virtual machine by using a resource in the resource pool corresponding to the data queue in which the multiple first data blocks are located.

Optionally, the resource pool determining module 904 is configured to:

sort address information of any one of the multiple second data blocks according to the preset rule, where the address information of the second data block includes a source address and a destination address, a source address of each of the multiple second data blocks is the same as a destination address of each first data block, and a destination address of each of the multiple second data blocks is the same as a source address of each first data block;

calculate a hash value of the second data block by using sorted address information of the second data block, where the hash value of the first data is the same as the hash value of the second data;

determine, according to the second mapping relationship, a NUMA node corresponding to the hash value of the second data block; and use a resource pool of the NUMA node corresponding to the hash value of the second data block as the resource pool corresponding to the multiple second data blocks.

Specifically, the data transmission apparatus described in this embodiment of the present application may be configured to implement some or all procedures in the embodiments of the data transmission methods described in the present application with reference to FIG. 3, FIG. 6, and FIG. 7.

In descriptions in this specification, descriptions about such reference terms as "an embodiment", "some embodiments", "an example", "a specific example", and "some examples" mean that specific features, structures, materials, or characteristics described with reference to the embodiments or examples are included in at least one embodiment or example of the present invention. In this specification, the foregoing examples of expressions of the terms are not necessarily with respect to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in this specification, provided that they do not conflict with each other.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include at least one such feature. In the descriptions about the present invention, "multiple" means at least two, for example, two or three, unless otherwise specifically limited.

Logic and/or steps shown in the flowcharts or described herein in other manners, for example, may be considered as a program list of executable instructions that are used to implement logical functions, and may be specifically implemented on any computer-readable medium, for an instruction execution system, apparatus, or device (for example, a computer-based system, a system including a processor, or another system that can fetch instructions from the instruction execution system, apparatus, or device and execute the instructions) to use, or for a combination of the instruction execution system, apparatus, or device to use. In terms of this specification, the "computer-readable medium" may be any apparatus that may include, store, communicate, propagate, or transmit programs, for the instruction execution system, apparatus, or device to use, or for a combination of the instruction execution system, apparatus, or device to use. More specific examples (this list is not exhaustive) of the computer-readable medium include the following: an electrical portion (an electrical apparatus) with one or more buses, a portable computer cartridge (a magnetic apparatus), a random access memory, a read-only memory, an electrically erasable programmable read-only memory, an optical fiber apparatus, and a compact disc read-only memory. In addition, the computer-readable medium may even be a piece of paper on which the programs can be printed or another appropriate medium, because, for example, optical scanning may be performed on the paper or the another medium, then processing, such as edition, decoding, or another appropriate means when necessary, may be performed to obtain the programs in an electrical manner, and then the programs are stored in a computer storage.

It should be understood that, parts in the present application may be implemented by using hardware, software, firmware, or a combination thereof. In the foregoing implementations, multiple steps or methods may be implemented by using software or firmware that is stored in a storage and that is executed by an appropriate instruction execution system. For example, if hardware is used for implementation, being similar to implementation in another implementation, any one or a combination of the following well-known technologies in the art may be used for implementation: a discrete logic circuit having a logic gate circuit that is used to implement a logical function for a data signal, an application-specific integrated circuit having an appropriate combinatorial logic gate circuit, a programmable gate array, a field programmable gate array, or the like.

In addition, the modules in the embodiments of the present application may be implemented in a form of hardware, or may be implemented in a form of a software functional module. When the integrated module is implemented in the form of a software functional module and sold or used as an independent product, the integrated unit may be stored in a computer-readable storage medium.

Although the embodiments of the present application are shown and described above, it can be understood that, the foregoing embodiments are examples, and cannot be construed as a limitation to the present invention. Within the scope of the present invention, a person of ordinary skill in the art may make changes, modifications, replacement, and variations to the foregoing embodiments.

What is claimed is:

1. A method of data transmission, comprising:
receiving, by a network interface card of a physical machine, a plurality of first data blocks of a service that are sent by another physical machine, wherein the network interface card includes one or more data queues, wherein the plurality of first data blocks are in a plurality of data flows, wherein the physical machine includes a non-uniform memory access (NUMA) server, wherein the NUMA server includes a plurality of NUMA nodes, wherein each of the plurality of NUMA nodes is configured with a resource pool and can access all the resource pools configured for the NUMA server;
allocating, by the network interface card, the plurality of first data blocks in the plurality of data flows to a same data queue of the one or more data queues in the network interface card, wherein each of the plurality of first data blocks in the plurality of data flows includes a separate source address and a separate destination address;

when a tuner of the physical machine generates scheduling information for the service, sending the plurality of first data blocks in the plurality of data flows to a virtual machine on the physical machine by using a resource in a resource pool of a single NUMA node of the plurality of NUMA nodes, wherein the single NUMA node is designated in the scheduling information, wherein the scheduling information schedules the resource from the resource pool of the single NUMA node to process the plurality of first data blocks in the plurality of data flows.

2. The method according to claim 1, further comprising:
when the tuner does not generate the scheduling information, determining, according to a correspondence between the data queue and the resource pool of the NUMA node, a second resource pool corresponding to the data queue in which the plurality of first data blocks are located, and sending the plurality of first data blocks to the virtual machine by using a resource in the second resource pool corresponding to the data queue in which the plurality of first data blocks are located.

3. The method according to claim 1, further comprising:
receiving a plurality of second data blocks of the service that are fed back by the virtual machine in response to the plurality of first data blocks; and
sending the plurality of second data blocks to the network interface card by using a second resource in the resource pool of the NUMA node designated in the scheduling information, wherein the resource pool of the NUMA node designated in the scheduling information also comprises the resource for processing the plurality of first data blocks.

4. The method according to claim 2, further comprising:
receiving a plurality of second data blocks of the service that are fed back by the virtual machine in response to the plurality of first data blocks;
determining a third resource pool corresponding to the plurality of second data blocks when the tuner does not generate the scheduling information, wherein the third resource pool corresponding to the plurality of second data blocks is the same as the second resource pool corresponding to the plurality of first data blocks; and
sending the plurality of second data blocks to the network interface card by using a resource in the third resource pool corresponding to the plurality of second data blocks.

5. The method according to claim 4, wherein the determining the second resource pool corresponding to the data queue in which the plurality of first data blocks are located comprises:
sorting address information of one of the plurality of first data blocks into sorted address information according to a preset rule, wherein the source addresses of all of the plurality of first data blocks are the same, and destination addresses of all of the plurality of first data blocks are the same;
calculating a hash value of the plurality of first data blocks by using the sorted address information of the one of the plurality of first data blocks; and
establishing a mapping relationship between the hash value and the NUMA node.

6. The method according to claim 5, wherein the sending the plurality of first data blocks to the virtual machine by using the resource in the second resource pool further comprises:
sending the plurality of first data blocks and the mapping relationship to the virtual machine by using a second resource in the second resource pool corresponding to the data queue in which the plurality of first data blocks are located.

7. The method according to claim 5, wherein the determining the third resource pool corresponding to the plurality of second data blocks comprises:
sorting address information of one of the plurality of second data blocks into second sorted address information according to the preset rule, wherein address information of each of the plurality of second data blocks comprises a source address and a destination address, wherein the source address of each of the plurality of second data blocks is the same as the destination address of each of the plurality of first data blocks, and the destination address of each of the plurality of second data blocks is the same as the source address of each of the plurality of first data blocks;
calculating a hash value of the plurality of second data blocks by using the second sorted address information of the one of the plurality of second data blocks, wherein the hash value of the plurality of first data blocks is the same as the hash value of the plurality of second data blocks;
determining, according to the mapping relationship, a NUMA node corresponding to the hash value of the plurality of second data blocks; and
using a resource pool of the NUMA node corresponding to the hash value of the plurality of second data blocks as the third resource pool corresponding to the plurality of second data blocks.

8. A physical machine, comprising:
a tuner;
a network interface card that includes one or more data queues; and
a non-uniform memory access (NUMA) server with a plurality of NUMA nodes, wherein each of the plurality of NUMA nodes is configured with a resource pool and can access all the resource pools configured for the NUMA server;
wherein the network interface card is configured to perform:
receiving a plurality of first data blocks of a service that are sent by another physical machine, wherein the plurality of first data blocks are in a plurality of data flows;
allocating the plurality of first data blocks in the plurality of data flows to a same data queue of the one or more data queues in the network interface card, wherein each of the plurality of first data blocks in the plurality of data flows includes a separate source address and a separate destination address;
when the tuner generates scheduling information for the service, sending the plurality of first data blocks in the plurality of data flows to a virtual machine on the physical machine by using a resource in a resource pool of a single NUMA node of the plurality of NUMA nodes, wherein the single NUMA node is designated in the scheduling information, wherein the scheduling information schedules the resource from the resource pool of the single NUMA node to process the plurality of first data blocks in the plurality of data flows.

9. The physical machine according to claim 8, wherein the network interface card further performs:
when the tuner does not generate the scheduling information, determining, according to a correspondence between the data queue and the resource pool of the NUMA node, a second resource pool corresponding to the data queue in which the plurality of first data blocks are located, and sending the plurality of first data blocks to the virtual machine by using a resource in the second resource pool corresponding to the data queue in which the plurality of first data blocks are located.

10. The physical machine according to claim 8, wherein the network interface card further performs:
receiving a plurality of second data blocks of the service that are fed back by the virtual machine in response to the plurality of first data blocks; and
sending the plurality of second data blocks to the network interface card by using a second resource in the resource pool of the NUMA node designated in the scheduling information, wherein the resource pool of the NUMA node designated in the scheduling information also comprises the resource for processing the plurality of first data blocks.

11. The physical machine according to claim 8, wherein the network interface card further performs:
receiving a plurality of second data blocks of the service that are fed back by the virtual machine in response to the plurality of first data blocks;
determining a third resource pool corresponding to the plurality of second data blocks when the tuner does not generate the scheduling information, wherein the third resource pool corresponding to the plurality of second data blocks is the same as a second resource pool corresponding to the plurality of first data blocks; and
sending the plurality of second data blocks to the network interface card by using a resource in the third resource pool corresponding to the plurality of second data blocks.

12. The physical machine according to claim 9, wherein the determining the second resource pool corresponding to the data queue comprises:
sorting address information of one of the plurality of first data blocks into sorted address information according to a preset rule, wherein the source addresses of all of the plurality of first data blocks are the same, and destination addresses of all of the plurality of first data blocks are the same;
calculating a hash value of the plurality of first data blocks by using the sorted address information of the one of the plurality of first data blocks; and
establishing a mapping relationship between the hash value and the NUMA node.

13. The physical machine according to claim 12, wherein the sending the plurality of first data blocks to the virtual machine by using the resource in the second resource pool comprises:
sending the plurality of first data blocks and the mapping relationship to the virtual machine by using the second resource in the second resource pool corresponding to the data queue in which the plurality of first data blocks are located.

14. A non-transitory computer-readable medium storing computer instructions for data transmission, which computer instructions, when executed by one or more processors of a network interface card in a physical machine, cause the network interface card to perform a data transmission method, wherein the method comprises:
receiving a plurality of first data blocks of a service that are sent by another physical machine, wherein the network interface card includes one or more data queues, wherein the plurality of first data blocks are in a plurality of data flows, wherein the physical machine includes a non-uniform memory access (NUMA) server, wherein the NUMA server includes a plurality of NUMA nodes, wherein each of the plurality of NUMA nodes is configured with a resource pool and can access all the resource pools configured for the NUMA server;
allocating the plurality of first data blocks in the plurality of data flows to a same data queue of the one or more data queues in the network interface card, wherein each of the plurality of first data blocks in the plurality of data flows includes a separate source address and a separate destination address;
when a tuner of the physical machine generates scheduling information for the service, sending the plurality of first data blocks in the plurality of data flows to a virtual machine on the physical machine by using a resource in a resource pool of a single NUMA node of the plurality of NUMA node, wherein the single NUMA node is designated in the scheduling information, wherein the scheduling information schedules the resource from the resource pool of the single NUMA node to process the plurality of first data blocks in the plurality of data flows.

15. The non-transitory computer-readable medium according to claim 14, the method further comprising:
when the tuner does not generate the scheduling information, determining, according to a correspondence between the data queue and the resource pool of the NUMA node, a second resource pool corresponding to the data queue in which the plurality of first data blocks are located, and sending the plurality of first data blocks to the virtual machine by using a resource in the second resource pool corresponding to the data queue in which the plurality of first data blocks are located.

16. The non-transitory computer-readable medium according to claim 14, the method further comprising:
receiving a plurality of second data blocks of the service that are fed back by the virtual machine in response to the plurality of first data blocks; and
sending the plurality of second data blocks to the network interface card by using a second resource in the resource pool of the NUMA node designated in the scheduling information, wherein the resource pool of the NUMA node designated in the scheduling information also comprises the resource for processing the plurality of first data blocks.

17. The non-transitory computer-readable medium according to claim 15, the method further comprising:
receiving a plurality of second data blocks of the service that are fed back by the virtual machine in response to the plurality of first data blocks;
determining a third resource pool corresponding to the plurality of second data blocks when the tuner does not generate the scheduling information, wherein the third resource pool corresponding to the plurality of second data blocks is the same as the second resource pool corresponding to the plurality of first data blocks; and sending the plurality of second data blocks to the network interface card by using a resource in the third resource pool corresponding to the plurality of second data blocks.

18. The non-transitory computer-readable medium according to claim 17, wherein the determining the second resource pool comprises:
  sorting address information of one of the plurality of first data blocks into sorted address information according to a preset rule, wherein the source addresses of all of the plurality of first data blocks are the same, and destination addresses of all of the plurality of first data blocks are the same;
  calculating a hash value of the plurality of first data blocks by using the sorted address information of the one of the plurality of first data blocks; and
  establishing a mapping relationship between the hash value and the NUMA node.

19. The non-transitory computer-readable medium according to claim 18, wherein the determining the third resource pool corresponding to the plurality of second data blocks comprises:
  sorting address information of one of the plurality of second data blocks into second sorted address information according to the preset rule, wherein address information of each of the plurality of second data blocks comprises a source address and a destination address, wherein the source address of each of the plurality of second data blocks is the same as the destination address of each of the plurality of first data blocks, and the destination address of each of the plurality of second data blocks is the same as the source address of each of the plurality of first data blocks;
  calculating a hash value of the plurality of second data blocks by using the second sorted address information of the one of the plurality of second data blocks, wherein the hash value of the plurality of first data blocks is the same as the hash value of the plurality of second data blocks;
  determining, according to the mapping relationship, a NUMA node corresponding to the hash value of the plurality of second data blocks; and
  using a resource pool of the NUMA node corresponding to the hash value of the plurality of second data blocks as the third resource pool corresponding to the plurality of second data blocks.

20. The non-transitory computer-readable medium according to claim 18, wherein the sending the plurality of first data blocks to the virtual machine by using the resource in the second resource pool comprises:
  sending the plurality of first data blocks and the mapping relationship to the virtual machine by using the second resource in the second resource pool corresponding to the data queue in which the plurality of first data blocks are located.

* * * * *